(12) United States Patent
Ewing et al.

(10) Patent No.: US 9,531,215 B2
(45) Date of Patent: *Dec. 27, 2016

(54) TRANSFER SWITCH WITH ARC SUPPRESSION

(75) Inventors: Carrel W. Ewing, Reno, NV (US); Andrew J. Cleveland, Reno, NV (US); James P. Maskaly, Sparks, NV (US); Dennis W. McGlumphy, Sun Valley, NV (US)

(73) Assignee: Server Technology, Inc., Reno, NV (US)

( * ) Notice: Subject to any disclaimer, the term of this patent is extended or adjusted under 35 U.S.C. 154(b) by 716 days.

This patent is subject to a terminal disclaimer.

(21) Appl. No.: 13/425,278

(22) Filed: Mar. 20, 2012

(65) Prior Publication Data

US 2012/0319485 A1    Dec. 20, 2012

Related U.S. Application Data

(63) Continuation of application No. 11/659,451, filed as application No. PCT/US2005/027585 on Aug. 1, 2005, now Pat. No. 8,138,634.

(60) Provisional application No. 60/592,986, filed on Jul. 31, 2004.

(51) Int. Cl.
*H02J 9/06* (2006.01)

(52) U.S. Cl.
CPC ............ *H02J 9/06* (2013.01); *H02J 2009/068* (2013.01); *Y10T 307/258* (2015.04); *Y10T 307/344* (2015.04); *Y10T 307/615* (2015.04); *Y10T 307/62* (2015.04); *Y10T 307/625* (2015.04); *Y10T 307/747* (2015.04); *Y10T 307/832* (2015.04)

(58) Field of Classification Search
USPC .............. 307/64, 65, 23, 43; 361/8; 323/205
See application file for complete search history.

(56) References Cited

U.S. PATENT DOCUMENTS

| | | |
|---|---|---|
| 3,558,910 A | 1/1971 | Dale et al. |
| 4,356,525 A | 10/1982 | Kornrumpf et al. |
| 4,598,330 A | 7/1986 | Woodworth |
| 4,638,175 A | 1/1987 | Bradford et al. |
| 4,674,031 A | 6/1987 | Siska, Jr. |
| 4,745,511 A | 5/1988 | Kugelman et al. |
| 4,769,555 A | 9/1988 | Pequet et al. |
| 4,811,163 A * | 3/1989 | Fletcher ............... H01H 9/542 307/141.8 |
| 4,890,005 A | 12/1989 | Schornack |
| 4,918,562 A | 4/1990 | Pulizzi et al. |
| 4,959,745 A | 9/1990 | Suguro |

(Continued)

OTHER PUBLICATIONS

U.S. Appl. No. 11/556,151, filed Nov. 2, 2006, Ewing et al.

(Continued)

*Primary Examiner* — Rexford Barnie
*Assistant Examiner* — Elim Ortiz
(74) *Attorney, Agent, or Firm* — Perkins Coie LLP

(57) ABSTRACT

An automatic transfer switch for a power system receiving multiple alternating current sources and delivering multiple alternating current output is described. A transfer switch control circuit can sense a power loss in one or both AC sources. Each power supply can deliver current to drive a load but, if one of the power supplies fails, the other can supply power to drive both loads.

46 Claims, 17 Drawing Sheets

(56) References Cited

U.S. PATENT DOCUMENTS

| | | | |
|---|---|---|---|
| 5,424,903 A | 6/1995 | Schreiber | |
| 5,506,573 A | 4/1996 | Ewing et al. | |
| 5,534,734 A | 7/1996 | Pugh et al. | |
| 5,739,594 A * | 4/1998 | Sheppard | H02J 9/06 307/126 |
| 5,790,394 A | 8/1998 | Cabaniss et al. | |
| 5,822,563 A | 10/1998 | Sitbon et al. | |
| 5,861,684 A | 1/1999 | Slade et al. | |
| 5,949,974 A | 9/1999 | Ewing et al. | |
| 5,959,368 A | 9/1999 | Kubo et al. | |
| 6,011,329 A | 1/2000 | McGovern | |
| 6,051,893 A * | 4/2000 | Yamamoto | H02J 9/06 307/43 |
| 6,172,432 B1 * | 1/2001 | Schnackenberg | H02J 3/14 307/125 |
| 6,229,691 B1 | 5/2001 | Tanzer et al. | |
| 6,388,854 B1 | 5/2002 | Berstis et al. | |
| 6,507,273 B1 | 1/2003 | Chang et al. | |
| 6,535,405 B2 | 3/2003 | Chen | |
| 6,600,238 B1 | 7/2003 | Emberty et al. | |
| 6,628,013 B2 | 9/2003 | Vogman | |
| 6,630,752 B2 | 10/2003 | Fleming et al. | |
| 6,711,613 B1 | 3/2004 | Ewing et al. | |
| 6,741,435 B1 | 5/2004 | Cleveland | |
| 6,768,225 B2 | 7/2004 | Chang et al. | |
| 6,826,036 B2 | 11/2004 | Pereira | |
| 6,879,060 B2 | 4/2005 | Hohri | |
| 6,960,842 B2 | 11/2005 | Ziegler et al. | |
| 6,968,465 B2 | 11/2005 | Freevol et al. | |
| 7,010,589 B2 | 3/2006 | Ewing et al. | |
| 7,043,543 B2 | 5/2006 | Ewing et al. | |
| 7,099,934 B1 | 8/2006 | Ewing et al. | |
| 7,162,521 B2 | 1/2007 | Ewing et al. | |
| 7,171,461 B2 | 1/2007 | Ewing et al. | |
| 7,259,945 B2 | 8/2007 | Cleveland | |
| 2002/0084697 A1 * | 7/2002 | Radusewicz | H02J 9/06 307/64 |
| 2002/0117900 A1 * | 8/2002 | Perttu | H02J 9/06 307/64 |
| 2002/0130556 A1 * | 9/2002 | Hohri | H02J 9/061 307/65 |
| 2003/0030412 A1 | 2/2003 | Matsuda et al. | |
| 2003/0042798 A1 | 3/2003 | Chang et al. | |
| 2003/0194920 A1 * | 10/2003 | Foch | H02J 9/06 323/205 |
| 2004/0076148 A1 * | 4/2004 | Ferry | H02J 9/06 370/389 |
| 2004/0084966 A1 * | 5/2004 | Yarbrough | H02J 9/06 307/64 |
| 2004/0262997 A1 | 12/2004 | Gull et al. | |
| 2005/0141154 A1 | 6/2005 | Consadori et al. | |
| 2006/0072531 A1 | 4/2006 | Ewing et al. | |

OTHER PUBLICATIONS

"TPC 4000/MTD: World's First 1U, 3O, 16A or 32A Distribution Unit," Pulizzi Engineering Inc., 2 pp. (1999).
"PC 5585: Voltage Selectable for 120V.about. or 240V.about., 1O, 50/60 Hz Up to 30A," Pulizzi Engineering Inc., 3 pp. (1999).
International Search Report for International Application No. PCT/US2005/027585; Date of Mailing: Sep. 6, 2006; 3 pages.
International Preliminary Report on Patentability and Written Opinion of International Application No. PCT/US2005/027585; Date of Mailing: Sep. 6, 2006; 10 pages.

* cited by examiner

TRANSFER SWITCH WITH ARC SUPPRESSION

CROSS-REFERENCES TO RELATED APPLICATIONS

This application is a continuation of pending U.S. patent application Ser. No. 11/659,451, which is a National Stage of International Patent Application No. PCT/US2005/027585, filed on Aug. 1, 2005, which claims the benefit of U.S. Provisional Application No. 60/592,986, filed Jul. 31, 2004. These applications are incorporated herein by reference in their entirety.

TECHNICAL FIELD

The disclosed technology relates to transfer switches. More particularly, certain embodiments provide an automatic transfer switch having a plurality of power inputs and outputs that continue to supply power to electrical devices in the event of a "downed" power input source.

BACKGROUND

An automatic transfer switch (ATS) is commonly used for power distribution systems having multiple utility feeds, inverters, generators, or uninterruptible power supplies (UPS). In the event of a power outage, an ATS will sense a primary input feed or power source loss and start or switch to an alternate power source, such as an emergency generator or battery back-up. When power is restored, the ATS automatically switches the load from the alternate power source back to the primary power source.

ATSs are often used when no downtime from a power outage is tolerated. For example, uninterruptible power supplies (UPSs) are often used to provide auxiliary back up power, such as a battery, to provide uninterrupted power for critical loads, such as computer systems and other data processing systems. UPSs are also used to help protect systems from lightning, power surges and sags, electrical line noise, utility outages, and wild voltage fluctuations.

However, typical UPSs are failure prone. An ATS enables using two or more power sources or UPSs together in a redundant fashion, so if one fails, or failure occurs from some other cause, the ATS will transfer the load to the other power source or UPS. This transfer is typically designed to be fast enough, such as through solid state relays, so that virtually all computer loads or telecommunications systems are unaffected. In addition, ATSs can provide an alternative to UPSs. For example, many hospital facilities with access to two utility grids are now replacing their failure prone UPSs with ATSs.

ATSs have found wide use. In the event of power failure, ATSs allow for uninterrupted operation of many electronic systems, such as home, business, computer, medical, and telecommunications systems. ATSs are typically used to protect Internet service providers, electronics, controls, network servers, imaging and audio systems, personal computers, modems, satellite systems, surveillance cameras, and telephones against damaging power surges and even lightning. Also, ATSs have been used to protect against the negative effects on circuitry from line noise, grid switches, power outage transients, and other electrical events.

Standard ATSs typically contain two input feeds. A primary input feed typically supplies power to all of the outlets in the ATS. If the primary input feed fails, typical ATSs transfer all of the outlets to a secondary input feed. The secondary input feed supplies power to all of the outlets until the primary input feed is restored. When the primary feed is restored, all of the outlets are transferred back to the primary feed.

Since the entire load is powered by one power source, the entire load must be transferred between power sources. Transferring an entire load may cause premature equipment wear, such as on relays or other parts used to transfer the load. Further, transfer of the entire load can generate large amounts of heat. Similarly, the voltage drop that occurs when switching, a high-current load between power sources can be quite large. Typically, when power is restored, all outlets are immediately switched back to the primary power source, potentially causing an overload due to the high in-rush current.

Because under normal operating conditions one power feed supplies all of the outlets in an ATS, ATS systems typically use battery back up or generators as secondary feeds.

Typical ATSs are designed to operate under a particular operating voltage range. Manufacturers typically produce a variety of ATSs for a variety of operating conditions. However, if a customer buys an ATS with a particular operating range and later needs an ATS having a different operating range, the customer typically must purchase a new ATS. This can be very expensive and inconvenient for the customer. In addition, producing a variety of ATSs to meet the varied operating voltage ranges can result in higher manufacturing cogs than if fewer ATSs were produced.

In transferring between sources of power in, for example, a transfer switch, one problem involves the suppression of (i) arcing across a relay gap as the relay opens or closes and (ii) associated wear and tear on the relay and possibly other components. Existing arc suppression circuitry, such as that described in U.S. Pat. No. 6,741,435 to Cleveland ("POWER CONTROLLER WITH DC ARC-SUPPRESSION RELAYS"), generally involves the use of an electromechanical relay providing for DC electricity to be controlled between a power source and an electrical load. When the DC power source experiences an interruption, the circuitry taught by the Cleveland patent utilizes a transistor to actively shunt current while the relay switches positions. The arc suppression circuit taught by the Cleveland patent is, however, not adapted for use in AC circuits.

SUMMARY

The present application provides methods and apparatus for transferring at least one power outlet between a plurality of power sources. Certain embodiments provide an automatic transfer switch (ATS).

In further embodiments, the ATS has a plurality of power outlets. Under normal operating conditions, a first portion of the plurality of power outlets are in power supply communication with a first power source of the plurality of power sources. A second portion of the plurality of power sources are ordinarily in power supply communication with a second power source of the plurality of power sources. If the first power-source fails, the first portion of the plurality of power outlets are connected to the second power source. When the first power source is restored, the first portion of the plurality of power outlets are reconnected to the first power source. Similarly, if the second power source fails, the second portion of the plurality of power outlets are connected to the first power source. The second portion of the plurality of power outlets are reconnected to the second power source when the second power source is restored.

The power outlets transferred from a failed power source (their primary power source) to a secondary power source can be immediately reconnected to their primary power source upon restoration of the primary power source. Alternatively, transfer back to the primary power source can be delayed for a period of time to ensure that the primary power source is stable. Additionally, outlets can be transferred sequentially to the primary or secondary power source, rather than being transferred simultaneously, in order to reduce the chance of a power overload or similar condition.

The ATSs according to certain embodiments of the disclosed technology thus provide for load balancing because loads connected to the ATS can be split between power outlets connected to the plurality of the power sources, rather than all of the loads being connected to a single power source. In load balanced systems, each of the plurality of circuits are only loaded to a fraction of their capacity, such as half capacity. Load balanced arrangements may result in less heating and voltage drop if a power feed failure and subsequent power transfer occurs due to reduced current being switched. Relay life may be extended since larger loads will only be applied to fewer power sources when an outage occurs, and the actual load switched is a fraction of the total load.

Further embodiments provide an ATS which may be configured to accept various input feed voltage ranges, thus allowing the ATS flexibility to be used under multiple operating conditions. Having an ATS that can be used in multiple environments may simplify manufacturing since fewer devices need be manufactured. Thus, inventory stock is reduced since the same component can be used in a variety of devices.

In at least one embodiment, the ATS has a printed circuit board with factory serviceable jumpers. These jumpers may allow for input feed voltage range configuration prior to shipment.

Further embodiments provide an ATS with a switch that may be operated by a user to select the input feed voltage range. The flexibility of the selectable input range may allow users to set the ATS as needed, obviating the need to purchase ATSs for a particular configuration.

Protection against power failure or interruption can be provided for devices having one connection to an ATS or for devices having multiple connections to an ATS. For example, some devices attached to the ATS have a first plug attached to an outlet from a first bank of outlets of the ATS. The first bank of outlets receives power from a first power source. At least a second plug from the same electrical device is attached to a second outlet in a second bank of outlets of the ATS. The second bank of outlets receives power from a second power source. The first power source and the second power source may be phase-synchronized or asynchronous and of corresponding amplitude.

At least one embodiment of the disclosed technology provides an ATS having a switch allowing manual selection of the primary power feed between first and second power sources selectably in power supply communication with at least one power outlet. An operator may manually designate the first and second power sources as a primary power source or a secondary power source by activating the switch. For example, when the switch is in a first position, the first power source is designated as the primary power source and the second power source is designated as the secondary power source and the first and second power source connections are made appropriately. When the switch is in a second position, the first power source is designated as the secondary power source and the second power source is designated as the primary power source and the first and second power source connections are made appropriately.

The power source designated as the primary power source normally powers at least one power outlet. If the power source designated as the primary power source fails, the ATS will transfer the at least one power outlet to the power source designated as the secondary power source. When power source designated as the primary power source is restored, the ATS will transfer the power outlet back to the power source designated as the primary source.

The transfer switch can be used in load balanced ATSs. For example, a first and second set of outlets can be selectably assigned a first or second power source as the primary power supply. The transfer switch may also allow the entire load to be transferred to a single power source.

Certain embodiments include novel active arc suppression circuitry. The arc suppression circuitry can actively monitor power being input to a set of outputs and automatically manage the transfer of power from one power source to another through a relay while eliminating or substantially reducing the possibility of arcing through the relay. In certain embodiments, the arc suppression circuitry may provide significantly faster and more reliable power switching than prior art circuitry. In addition, such circuitry may also be combined with multiple power supply failsafe circuitry to even further enhance the reliability of the transfer switch or similar types of devices.

In the preferred embodiments, the structures disclosed are all mounted in a single housing, and the housing can be adapted to be mounted in standard electronic components racks, such as RETMA racks, among others.

It is to be understood that this Summary lists various aspects of various embodiments of the disclosed technology. Additional aspects of the disclosed technology will become apparent as this specification proceeds.

It is also to be understood that all features noted above need not be included in a given embodiment in order for the embodiment to fall within the scope of the disclosed technology, and that not all deficiencies noted in the prior art need be overcome by a given embodiment in order for it to fall within the scope of the disclosed technology.

BRIEF DESCRIPTION OF THE DRAWINGS

Preferred embodiments of the disclosed technology are shown in the accompanying drawings in which.

DETAILED DESCRIPTION

In the following description, it is to be understood that the use of relational terms, if any, such as first and second, top and bottom, left and right, and the like are used to distinguish one from another entity or action without necessarily, by themselves, requiring or implying any actual such relationship or order between such entities or actions.

Figure 1:
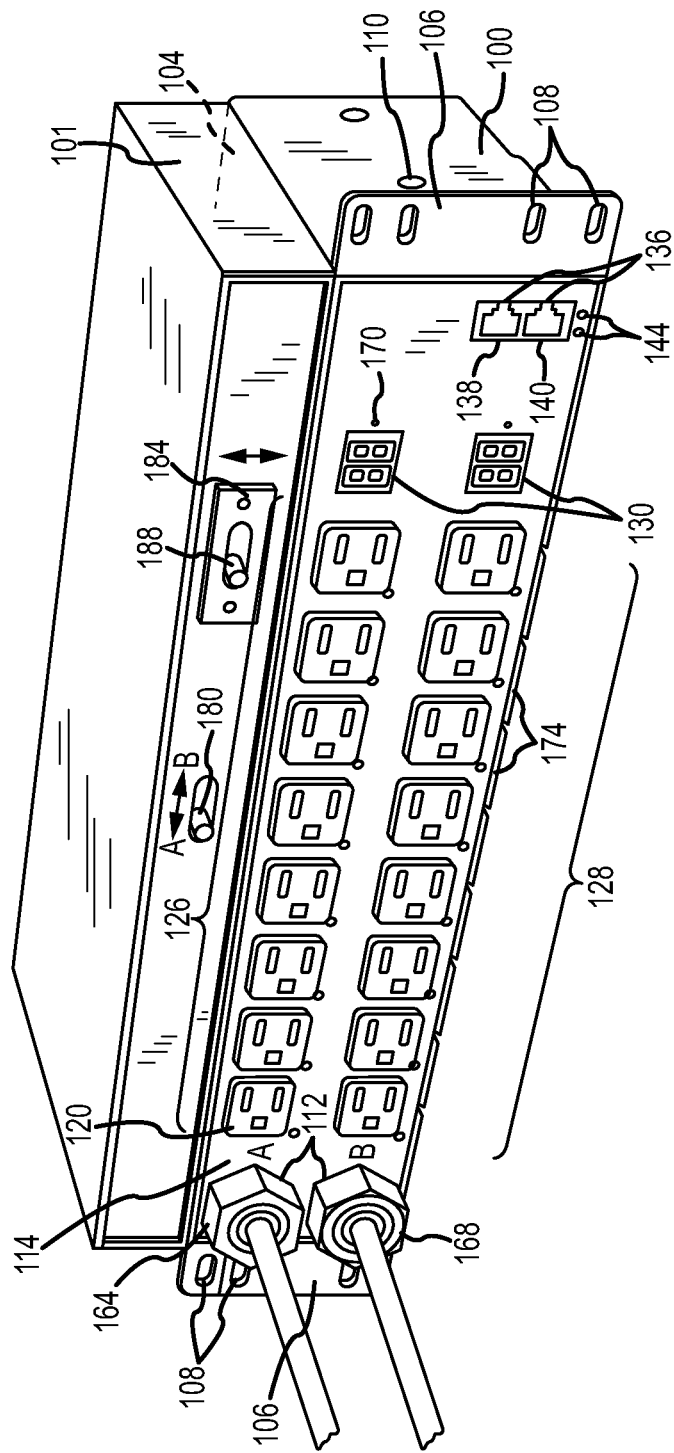
FIG. 1 is a front view of a combination of two exemplary transfer switches, each of which implements an automatic transfer switch circuit.

FIG. 1 shows a combination of two transfer switches 100 and 101, each of which implements an automatic transfer switch. Transfer switch 100 has a housing 104 that encloses and protects internal components. In at least one embodiment, the transfer switch 100 has a height of less than about 3.2 inches. The housing 104 has mounting flanges 106 with mounting apertures 108 through which fasteners (not shown), such as screws, may be inserted to secure the transfer switch 100 in its operating environment, such as to a rack (not shown). In certain embodiments, the mounting flanges 106 may be secured to the lateral sides of the housing 104 using fasteners 110, such as screws.

Two power inputs 112 penetrate the front side 114 of the housing 104. The power inputs 112 may be of any suitable capacity, such as 20 A, 30 A, or 60 A. The power inputs 112 may have various connectors, for example, straight-blade or twist-lock plug connectors at 110V or 400 VAC. Another exemplary connector is a pin-sleeve connector.

A plurality of power outlets 120 are located longitudinally on, and extend outward from, the front side 114 of the housing 104. The power outlets 120 are shown in two rows, each row having 8 power outlets 120. Different numbers and arrangements of the power outlets 120 may be used. The power outlets 120 are arranged in branches 126, 128. Both the power outlets 120 and the power inputs 112 may be supplied with cable-retention brackets (not shown).

The number of branches 126, 128 may be varied as desired. Similarly, any desired number of power outlets 120 may be used in each branch 126, 128. In certain embodiments, each branch 126, 128 may be separately controlled, monitored, or supplied with power. For example, each of the two branches 126, 128 shown in FIG. 1 may normally be supplied with power from one of the two power inputs 112.

A plurality of displays 130 are located on the front side 114 of the housing 104. The displays 130 are shown as LED displays. However, other display types could be used, such as LCD displays. The number and location of the displays 130 may be varied as desired.

The displays 130 display the amount of current being supplied by each power input 112. However, additional or alternate information could be shown on the displays 130, such as the load on branches 126, 128.

Communication ports 136 are accessible from the front side 114 of the housing 104. The communication ports 136 allow the transfer switch 100 to communicate information to, or receive information from, other devices. For example, the communication ports 136 may allow a user to monitor and/or control the power outlets 120 or a branch 126, 128. The communication ports 136 may be of various types, including a serial port 138 and an Ethernet port 140. One or more connection indicators 144 provide information on the status of communications ports 136.

The transfer switch 100 provides protection against power loss or interruption to one or more devices (not shown) connected to power outlets 120. That is, if a power input 112 supplying a particular power outlet 120 is interrupted, the transfer switch 100 will connect an alternate power input 112 to supply the power outlet 120. Each device may be attached to one or more power outlet 120.

The transfer switch 100 may be configured to carry loads on multiple branches 126, which may receive power from different circuits. In the transfer switch 100, a first power input 164 routinely powers a first branch of outlets 126. A second power input 168 routinely powers a second branch of outlets 128. However, if power to the first or second power inputs 164, 168 is interrupted, the transfer switch 100 will transfer the power outlets 120 supplied by that power input 164, 168 to the other power input 164, 168. In at least certain embodiments, the transfer occurs in fewer than 18 milliseconds to avoid any interruption of power to the devices attached to the branch of outlets 126, 128 that were supplied by the interrupted power input 164, 168.

In at least certain embodiments, the transfer switch 100 allows load balancing between power outlets 120, such as between first and second outlet branches 126, 128. Both power inputs 164, 168 are routinely loaded on power outlets 120 on corresponding branches 126, 128, but only to partial capacity. For example, if each power input 164, 168 supplies a 20 A circuit, each circuit can be loaded to a 10 A maximum; 30 A circuits can be loaded to a 15 A maximum, etc. Compared to the same load being supplied by a single power input, load balancing may result in less heat and consequently less voltage drop. Load balancing may result in less wear on system components. Only when an interruption of a power input 164, 168 occurs will the entire load be supplied by a single power input 164, 168.

A particular device attached to the transfer switch 100 may be attached to one or a plurality of power outlets 120. If a device is connected to plurality of power outlets 120, the outlets may be in the same or different branches 126, 128. In one embodiment, only one power outlet 120 at a time supplies a device with power. In another embodiment, multiple power outlets 120 simultaneously supply the device with power.

The transfer switch 100 may be provided with a number of other features. For example, the transfer switch 100 may include a secure proxy, which creates a secure channel for network traffic and may be used by a remote operator who may thereby centrally manage a number of transfer switches 100 and other devices. Communications access and management may be provided by any suitable protocol, including, without limitation, HTML, SNMP, Telnet, out-of-band (internal or external modem), or RS-232 serial control. Communications may be directed through communication means such as a communication port 136, including the serial port 138 and/or the Ethernet port 140. In at least certain embodiments, a field-replaceable modem (e.g., modem carrier module 220 of FIG. 2) can also be added to transfer switch 100.

In certain embodiments, each power outlet 120 can be individually controlled, which may allow a user to take actions such as to remotely reboot locked-up devices attached to the transfer switch 100, such as network servers and internetworking devices. Similarly, unused power outlets 120 can be powered-off to prevent unauthorized power consumption. Certain embodiments allow power outlets 120 of the transfer switch 100 to be grouped together, or grouped with outlets on other transfer switches (or other devices), so that multiple devices can be rebooted with one command.

In further embodiments, the transfer switch 100 measures and displays the current that attached devices are drawing from each power input 112, or by a branch 126, 128, on the displays 130. In this way, the displays 130 provide on-site verification of the aggregate current drawn from a particular power input 112 or by a branch 126, 128. The same information may be provided to a remote user, such as by an interface screen (not shown) which reports the same current measurement. The transfer switch 100 has indicators 130 corresponding to each power input 112. The indicators 130 indicate which power inputs 112 are available and supplying power. Similar indicators 174 are provided for power outlets 120.

Certain embodiments of the transfer switch 100 allow a user to designate which power input 112 will be the primary power input 112 for a power outlet 120, or branch 126, 128. The user may also designate which power input 112 will be the secondary, or alternate, power input 112 for a power outlet 120 or branch 126, 128. The process of changing primary and secondary designations of power inputs 112 initiates a power transfer process only if both infeeds are currently sourcing power. In certain embodiments, this power transfer process is the same process that occurs upon interruption of a power input 112.

In at least one embodiment, the transfer switch 100 is provided with one or more input devices (not shown), such as buttons or a toggle switch (e.g., the primary power switch 180 of transfer switch 101), by which the user change primary and secondary power input 112 designations. In this way, a user can switch a load between power inputs 112, such as to work on a power input 164, 168 without dropping or interrupting power to any connected equipment. In at least certain embodiments, the transfer rate between power inputs 112 is 18 milliseconds or less. Phase synchronization between primary and secondary power inputs 112 is not required.

In further embodiments, the transfer switch 100 has the ability to select a high voltage, for example 200-230V, or low voltage, for example, 110-120V, operating range, according to the type of power inputs used by the transfer switch 100. For example, transfer switch 101 has a voltage range switch 188 and two LEDs 184 that designate which voltage range has been selected. The transfer switch 100 thus can be used as a universal power transfer switch for electronic devices, regardless of the operating voltage. In at least one embodiment, the operating range may be selected by removing a panel (not shown) of transfer switch 100 and a user may choose the appropriate voltage range and then apply power to the transfer switch 100. In further embodiments, the operating range may be selectable by means of jumpers (not shown). The jumpers may be set during the manufacturing process or after assembly.

Figure 2:
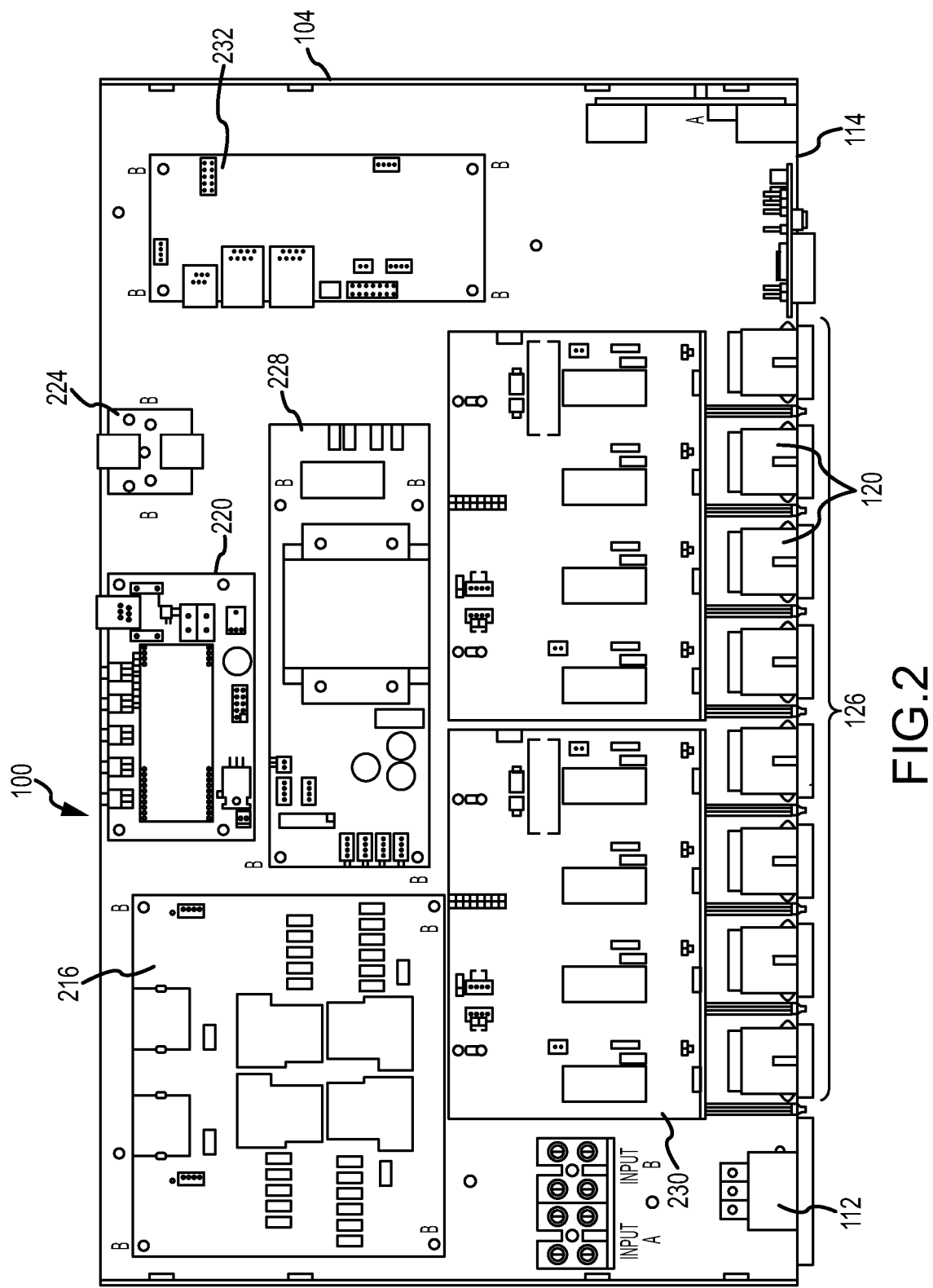
FIG. 2 is an inside view of a transfer switch, such as the exemplary transfer switch 100 of FIG. 1.

As shown in FIG. 2, a view of the interior of the transfer switch 100, power outlets 120 and power inputs 112 extend through the front side 114 of the housing 104. A modem carrier module 220, transfer module 216, a double RJ12 module 224, a power supply module 228, four power modules 230, and a network personality module 232 are disposed within the interior of transfer switch 100. These modules are circuit boards which contain electronic circuitry that, in conjunction with the mounted components, provide one or more of the functions described above.

Figure 3:
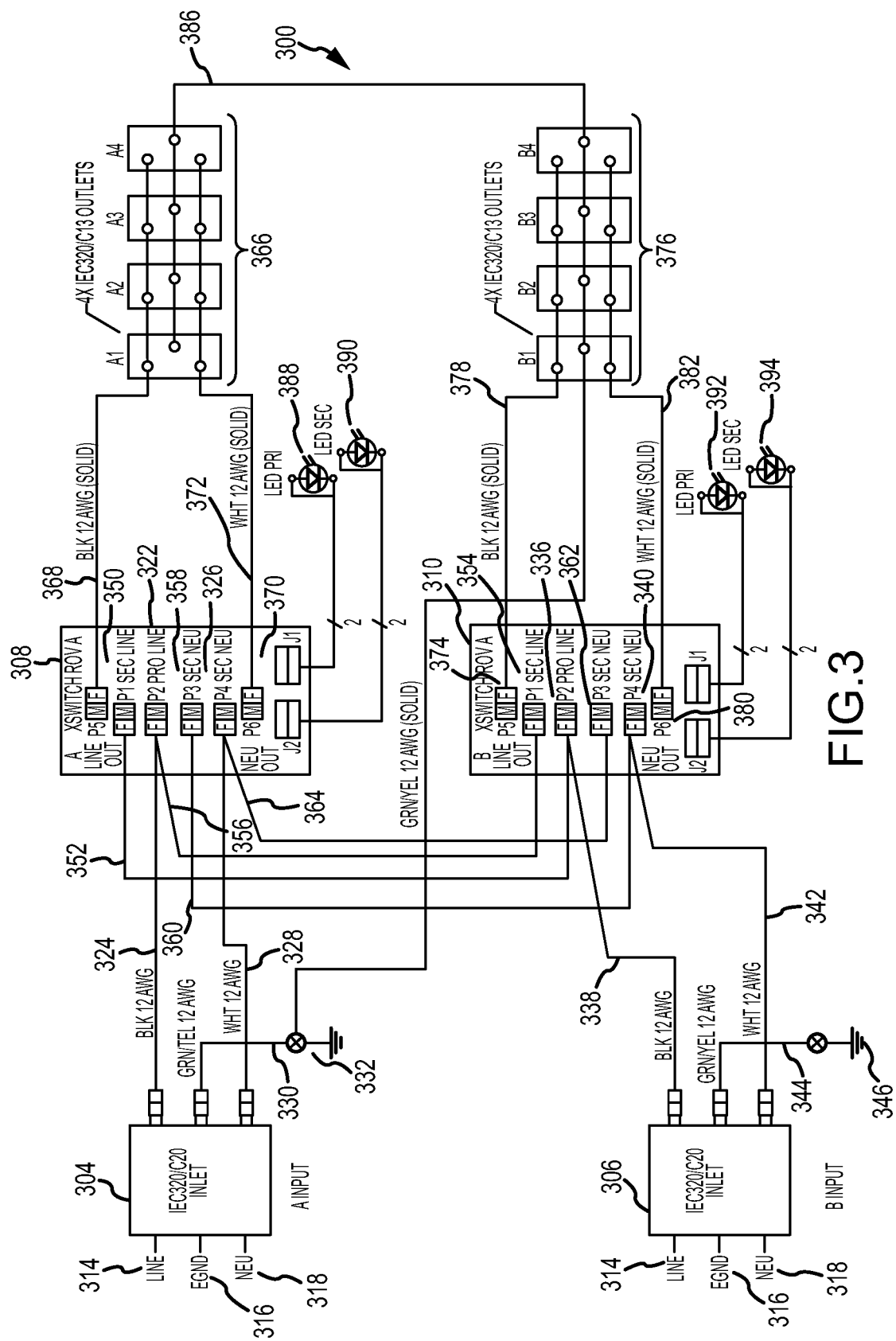
FIG. 3 is a schematic wiring diagram of exemplary failsafe circuitry that can be implemented in a transfer switch, such as the exemplary transfer switch 101 of FIG. 1.

With reference now to the schematic wiring diagram of exemplary failsafe circuitry shown in FIG. 3, a power control device 300 has multiple power inputs, such as power inputs 304 and 306, which transfer power from separate power sources, such as from a power grid, a generator, a battery, etc. Power inputs 304 and 306 provide power to power outlets 366 and 376. Power input 304 is coupled to switch 308 and power input 306 is coupled to switch 310.

Power inputs 304, 306 include line 314, equipment ground 316, and neutral 318 contacts. Power input 304 is connected to primary line contact 322 of switch 308 by a wire 324. Power input 304 is connected to primary neutral contact 326 of switch 308 by a wire 328. A wire 330 connects power input 304 to ground 332. Power input 306 is connected to primary line contact 336 of switch 310 by a wire 338. Power input 306 is connected to primary neutral contact 340 of switch 310 by a wire 342. A wire 344 connects power input 306 to ground 346.

Switches 308 and 310 are connected to manually prevent against power loss or interruption protection for devices attached to the transfer switch 100. In addition, the transfer switch may be operated by a user to transfer power sources, such as to use a more stable source or to allow work on one of the power sources 304 or 306.

With continued reference to FIG. 3, secondary line contact 350 of switch 308 is connected to the primary line contact 336 of switch 310 by a wire 352. The primary line contact 322 of switch 308 is connected to secondary line contact 354 of switch 310 by a wire 356. Secondary neutral contact 358 of switch 308 is connected to the primary neutral contact 340 of switch 310 by a wire 360. The primary neutral contact 326 of switch 308 is connected to secondary neutral contact 362 of switch 310 by a wire 364.

The line out contact of switch 308 is connected to power outlets 366 by a wire 368. Although four power outlets 366 are shown, more or less power outlets 366 could be used. Neutral out contact 370 of switch 308 is connected to power outlets 366 by a wire 372. Line out contact 374 of switch 310 is connected to power outlets 376 by a wire 378. Although four power outlets 376 are shown, more or less power outlets 376 could be used. Neutral out contact 380 of switch 310 is connected to power outlets 376 by a wire 382. Power outlets 366, 376 are connected to ground 332 by a wire 386.

The power control device 300 is provided with LED indicators 388, 390 which are used to indicate the operation of the primary or secondary lines of switch 308, respectively. LED indicators 392, 394 represent operation of the primary or secondary lines of switch 310, respectively.

While shown as single lines, the power inputs 304, 306 may be multi-phase or single-phase. Throughout this disclosure, reference is sometimes made to particular voltages or voltage ranges. In the context of AC sources, it is to be understood that the AC sources are maintaining a voltage at a particular RMS level. For example, in the United States, a standard household outlet delivers approximately 120 volts AC and in parts of Europe, 220 volts AC is typically delivered. While reference is made to particular voltages or voltage ranges, it is understood that the voltages referred to herein are exemplary and are not meant to limit the scope of the disclosed technology.

Figure 4:
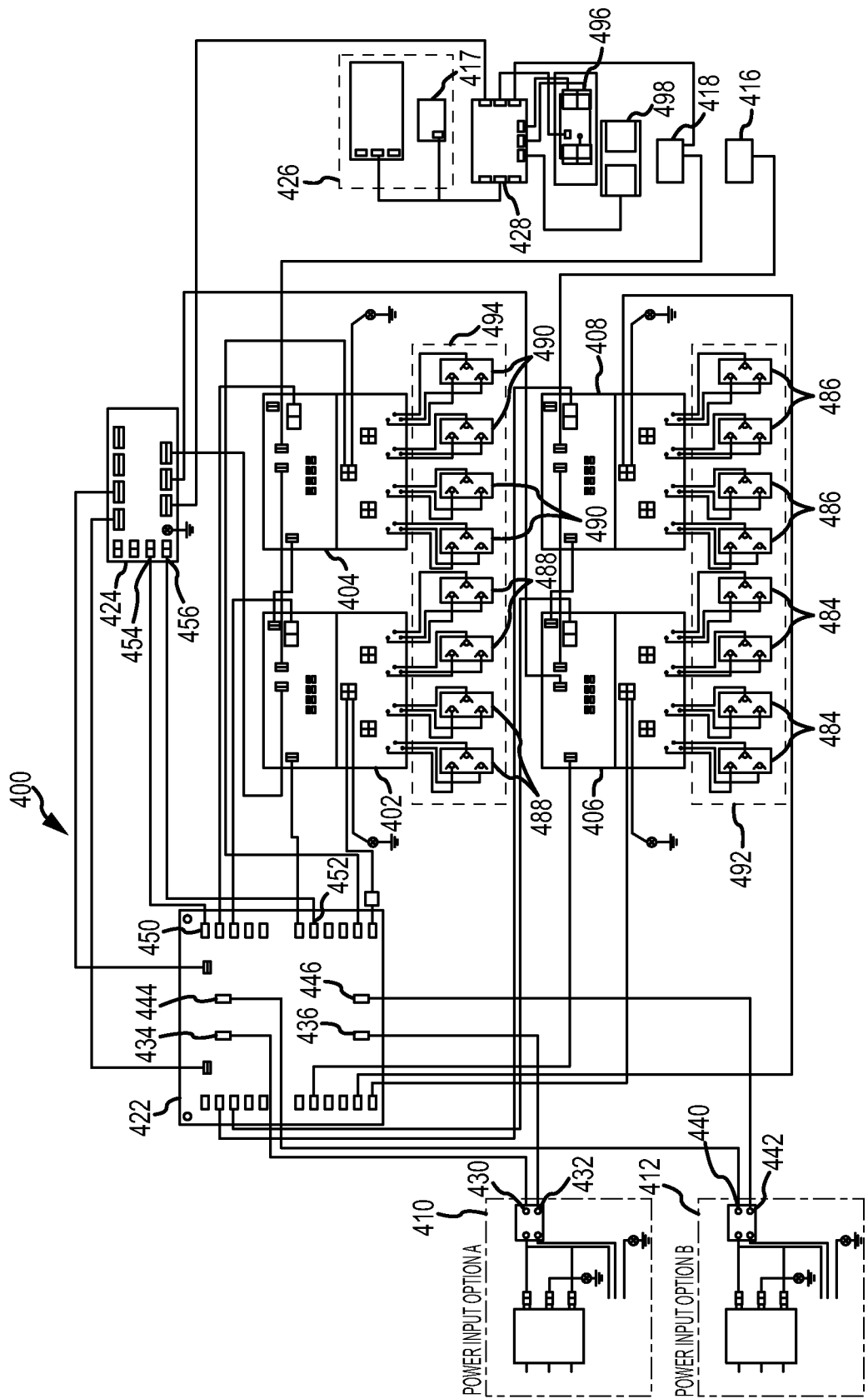
FIG. 4 is an exemplary schematic wiring diagram of a transfer switch, such as the transfer switch 100 of FIG. 1.

FIG. 4, a schematic wiring diagram of a transfer switch 400, shows how intelligent power modules (IPMs) 402, 404, 406, 408, power inputs 410, 412, displays 416, 418, a power transfer module 422, a power supply module 424, a modem-carrier module 426, and a network personality module 428 are interconnected. IPMs 402, 404, 406, 408 are components that may be used to monitor or control power outlets 120 or branches 126, 128. Suitable IPMs include those used in devices available from Server Technology, Inc. of Reno, Nev. Representative models include the Power Tower XL and the 4820-XL-4.

Power inputs 410, 412 are IEC320/20 power inlets. However, other power inlets may be used. Line and neutral contacts 430, 432 of power input 410 are connected to contacts 434, 436 of power transfer module 422. Similarly, line and neutral contacts 440, 442 of power input 412 are connected to contacts 444, 446 of power transfer module 422.

Contacts 450, 452 of the power transfer module 422 are connected to contacts 454, 456 of power supply 424. Suitable network personality modules include those used in products sold by Server Technology, Inc. of Reno, Nev.

The power transfer module 422 is connected to IPMs 402, 404, 406, 408. IPMs 402, 404, 406, 408 are connected to power outlets 484, 486, 488, 490, respectively. Power outlets 484, 486 form a first branch of outlets 492. Power outlets 488, 490 form a second branch of outlets 494 and are connected to display 418. The displays 416, 418 are used to indicate that power is being sourced from the associated input feed to the associated output.

The modem carrier module 426 provides an out-of-band connection and is connected to the network personality module 428. A port for the modem carrier module 426 supports a DB9 female to IDC10 male connection. A port for the network personality module 428 supports a double RJ45 to RJ45 connection 496 and a double RJ12 to RJ12 connection 498.

Thus, as long as at least one of power inputs 410, 412 is active, the power transfer module 422 supplies uninterrupted power to IPMs 402, 404, 406, 408, which in turn supply power to power outlets 484, 486, 488, 490. If one of the two power inputs 410, 412 becomes unavailable, the power transfer module 422 will automatically switch to the other power input 410, 412 to supply power to devices previously supplied by the unavailable source.

Figure 5:
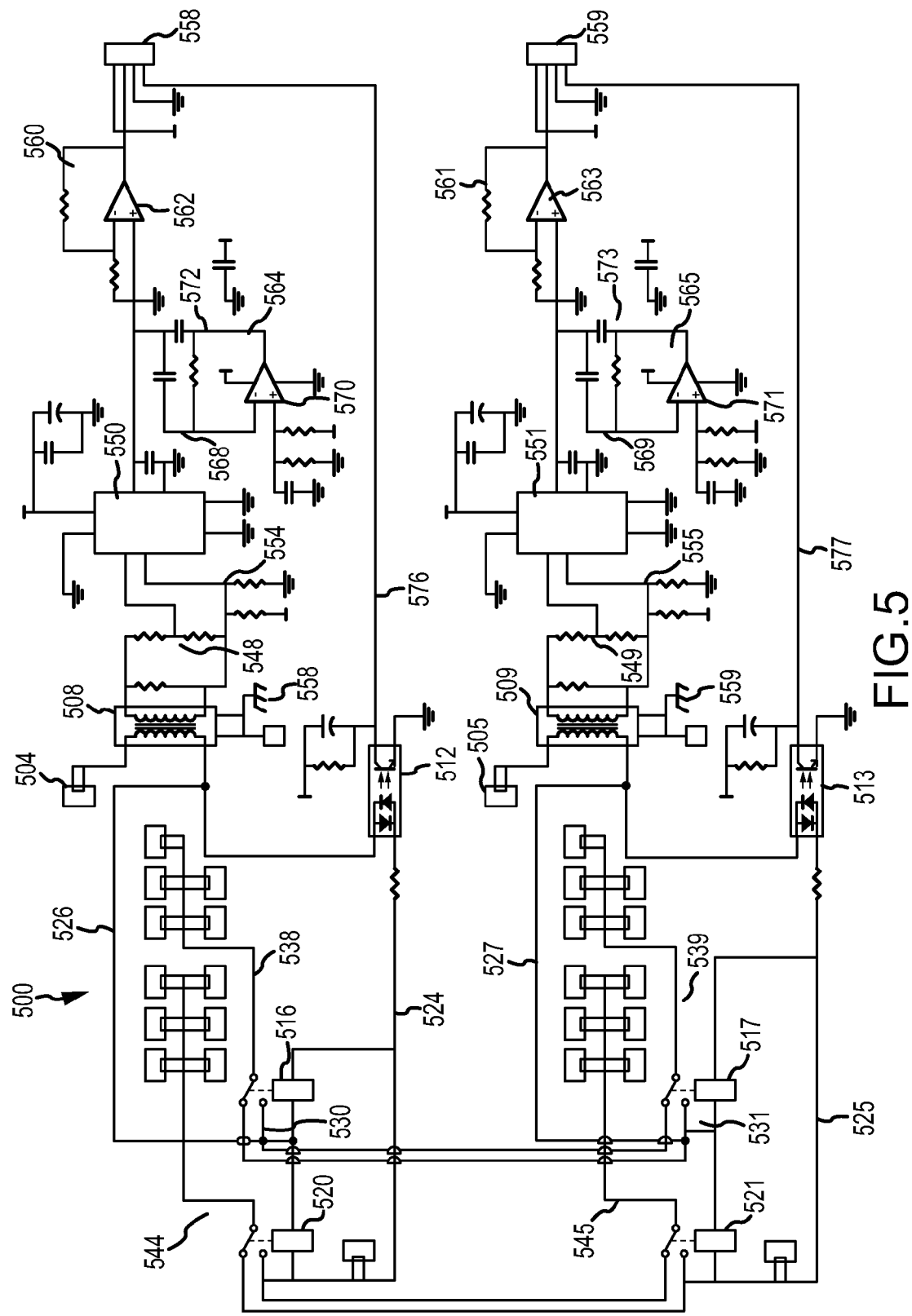
FIG. 5 is a schematic diagram of an exemplary automatic transfer switch circuit, such as the automatic transfer switch circuit implemented in the transfer switch 100 of FIG. 1.

Turning now to FIG. 5, a schematic drawing of an embodiment 500 of the power transfer module 422 of FIG. 4 is shown. The power transfer module 500 is shown in a state where power is not being supplied. In the non-energized state as shown, power source 504 is connected to pin 2 of a first end of primary winding of a transformer 508. Pin 1 on a second end of the primary side of transformer 508 is connected to pin 1 of opto-sensor 512. In addition, pin 2 of opto-sensor 512 is coupled to pin 2 of a coil of relay 516 through resistor R13, to connector P25, and to pin 3 of a coil of relay 520, all of which are commonly connected to neutral-in 524. Pin 1 of transformer 508 is connected via line-in 526 to pin 3 of a coil of relay 516 coil which is connected to pin 2 of a coil of relay 520 and to switching pole 530 of relay 516. Neutral output contacts P2, P3, P4, P8, P9, P10 are connected to common pin 1 of relay 520 via neutral-out connection 544. Line output contacts P5, P6, P7, P11, P12 are connected to common pin 1 of relay 516 via a line-out connection 538.

The secondary side of transformer 508 has a resistor R23 connected across pins 3 and 4 and a voltage divider including series connected resistors R1 and R3 connected in parallel thereto. A node 548 between resistors R1 and R3 of the voltage divider is connected to an input IN1 of a RMS chip 550, and a node 554 which connects pin 4 of transformer 508 to resistors R19 and R20 is connected to an input IN2 of RMS chip 550.

An output Vout from pin 5 of RMS chip 550 is coupled to a connector 558 through pin 5 of a gain stage amplifier circuit 560. Pin 7 of gain stage amplifier circuit 560 is coupled to pin 6 of op-amp 562 and to pin 2 of connector 558 through resistor R11. Pin 3 of connector 558 is coupled to a ground. Pin 6 of the gain stage amplifier circuit 560 is coupled to ground through resistor 7. Pin 5 of RMS chip 550 is also coupled to a filter stage circuit 564. The filter stage circuit 564 includes two series connected capacitors C15, C16 connected in parallel to a resistor R5. One node 568 from the parallel combination of capacitors C15, C16, and resistor R5 is connected to pin 2 of op-amp 570 and another node 572 is connected to pin 1 of the op-amp 570. Pin 3 of the op-amp 570 is connected to a capacitor C2 and resistors R15, R17. C2 and R15 are connected to ground, and R17 is connected to +5 VDC. A capacitor C5 is connected in parallel to Vout from pin 5 and Vout_rtn from pin 6 of the RMS chip 550. Pin 4 of connector 558 is coupled to pin 4 of the opto-sensor 512 as indicated by on-sense 576. An analogous connection scheme is provided for the sensing of AC source 505.

The dashed lines above the relays 516, 517, 520, 521 indicate that the position of the relays 516, 517, 520, 521 can be up or down. As shown in FIG. 5, both sensing circuits 576, 577 are in the non-operational mode as indicated by the up-position of all of the relays 516, 517, 520, 521. Relays 516, 520 cooperate as a line and neutral switching mechanism and are triggered by AC source 504 to supply power to a load connected to power outlets (not shown in FIG. 5) connected to contacts P2-P12. Likewise, relays, 517, 521 cooperate as a line and neutral switching mechanism and are triggered by AC source 505 to supply power to a load connected to power outlets (not shown in FIG. 5) connected to contacts P14-P24. When the relays 516, 517, 520, 521 are triggered, the position will change from an upward position, as shown, to a downward position.

Once power is supplied by AC source 504, the contacts P2, P3, P4, P8, P9, and P10 are connected through transformer 508 to AC source 504. Similarly, once power is supplied by AC source 505, the contacts P14, P15, P16, P17, P18, and P19 are connected through transformer 509 to AC source 505.

In an energized state, respective common leafs connected to pin 1 of each of relays 516, 520 are thrown into a downward position connecting to respective pins 4 of each of the relays 516, 520 which creates a connection to pin 5 of each of the relays 517, 521. Similarly, in an energized state, respective common leafs connected to pin 1 of each of the relays 517, 521 are thrown into a downward position connected to respective pins 4 of each of the relays 517, 521 which creates a connection to pin 5 of each of the relays 516, 520.

Coils for relays 516, 517, 520, 521 are triggered or activated when current is sensed through primary windings in respective transformers 508, 509. For example, triggering of relays 516, 520 throws their respective leafs into a downward position such that current flows through pin 4 of each of the relays 516, 520 which are coupled to the line-in 526 and neutral-in 524 from source 504. Similarly, triggering of relays 517, 521 throws their respective leafs into a downward position such that current flows through pin 4 of each of the relays 517, 521 which are coupled to the line-in 527 and neutral-in 525 from source 505. Therefore, power outlets (not shown) connected to contacts P2-P12 are coupled to line-out 538 and neutral-out 544 and power outlets (not shown) connected to contacts P14-P24 are coupled to line-out 539 and neutral-out 545 through relays 516, 520 and 517, 521, respectively.

Since opto-sensors 512, 513 are connected at one end to source 504, 505, respectively, through transformers 508, 509, respectively, the relays 516, 517, 520, 521 are capable of automatically switching the path of one or both AC sources 504, 505 when an AC source failure on AC source 504 or 505 is sensed by sensing circuits 577, 576, respectively.

A load on outlets connected to contacts P2-P12 is connected to AC source 504 through a winding of transformer 508 and includes a power flow line having a line-in 526 coupled to line-out 538 through relay 516, a neutral-in 524, and a neutral-out 544 coupled to connector P25 through relay 520. A load on outlets connected to contacts P14-P24 is connected to AC source 505 through a winding of transformer 509 and includes a power flow line having a line-in 527 coupled to a line-out 539 through relay 517, a neutral-in 525, and a neutral-out 545 coupled to connector P26 through relay 521.

The power flow lines provide multiple conducting paths from the input lines to the output lines to ensure that power connections can be made from one or the other of AC sources 504, 505 to loads connected to at least one of contacts P2-P12 and P14-P25, respectively, if one of the AC sources 504 or 505 fails. This "fail-safe" method prohibits the power transfer module 500 from assuming or maintaining an unsafe state. In other words, a state known to be safe, power being supplied, is assumed by transferring the source of power between the AC sources 504, 505.

Power loss or interruption protection is accomplished by connecting pin 5 of relay 516 with pin 4 from relay 517, pin 4 of relay 516 with pin 5 from relay 517 on the line-in sides; and on the neutral side by connecting pin 5 from relay 520 with pin 4 from relay 521 and by connecting pin 5 from relay 521 with pin 4 from relay 520.

The power transfer module 500 monitors the AC sources 504, 305. If a power loss is detected, the power transfer module 500 automatically activates or de-activates relays 516, 517, 520, 521 connected to one or both current sensing transformers 508, 509 to change the path of current flowing through the power transfer module 500 by transferring the line and neutral connections. When both AC sources 504, 505 are available, all of the relays 516, 517, 520, 521 are in the same position and each of the loads connected to output connections P2-P12, P14-P24 are supplied with power from AC source 504, 505, respectively. If one of the AC sources 504, 505 is unavailable, one set of relays 516, 520; 517, 521 is in one position and the other set of relays 516, 520; 517, 521 is in a different position, so that power is provided to both of the sensing circuits from one of the available AC sources 504, 505.

Transformers 508, 509 perform current sensing at their inputs. Current from input power sources 504, 505 flow through the primary windings of transformers 508, 509, respectively. The secondary windings of transformers 508, 509 can provide a 500:1 reduction in the primary current sensed. The secondary current from transformers 508, 509 can be converted to voltage by resistors R23, R24, respectively. This voltage can be further divided down by the voltage divider circuit comprising R1, R3 for transformer 508, and R2, R4 for transformer 509. These voltages, which are alternating current in nature, are converted to their effective direct current by true RMS chips 550, 551. Filtering of the RMS chip 550, 551 to provide a smoothed DC output can be performed by lo-pass filter circuits 564, 565. Supplemental voltage scaling of output can be provided by gain stage amplifiers 560, 561.

The cases of the transformers 508, 509 can be coupled to an earth or chassis ground connector 558, 559. Since the power sources 504, 505 are monitored for current flow, real-time current measurement can be provided for each load connected to power outlets connected to contacts P2-P12 and P14-P24, such as on displays 130 on the transfer switch 100 of FIG. 1.

Detection of a power infeed loss for power feeds 504, 505 can be performed by opto-sensors 512, 513, respectively. When current flows through transformer 508, due to voltage being available from power infeed 504, opto-sensor 512 will activate and change the state of the infeed on-sense 576 to reflect that infeed 504 is active and sourcing power. The equivalent circuit is present for power feed 505 via opto-sensor 513.

Although two power sources 504, 505 are shown in FIG. 5 more power sources could be utilized, if desired. Parallel relays, for example can be used in conjunction with the additional power sources.

Although FIG. 5 shows single-phase load balancing, it is contemplated that the above structure can also be used for multi-phase balancing or for sources having different phases as long as a method of phase synchronization is provided.

Figure 6:
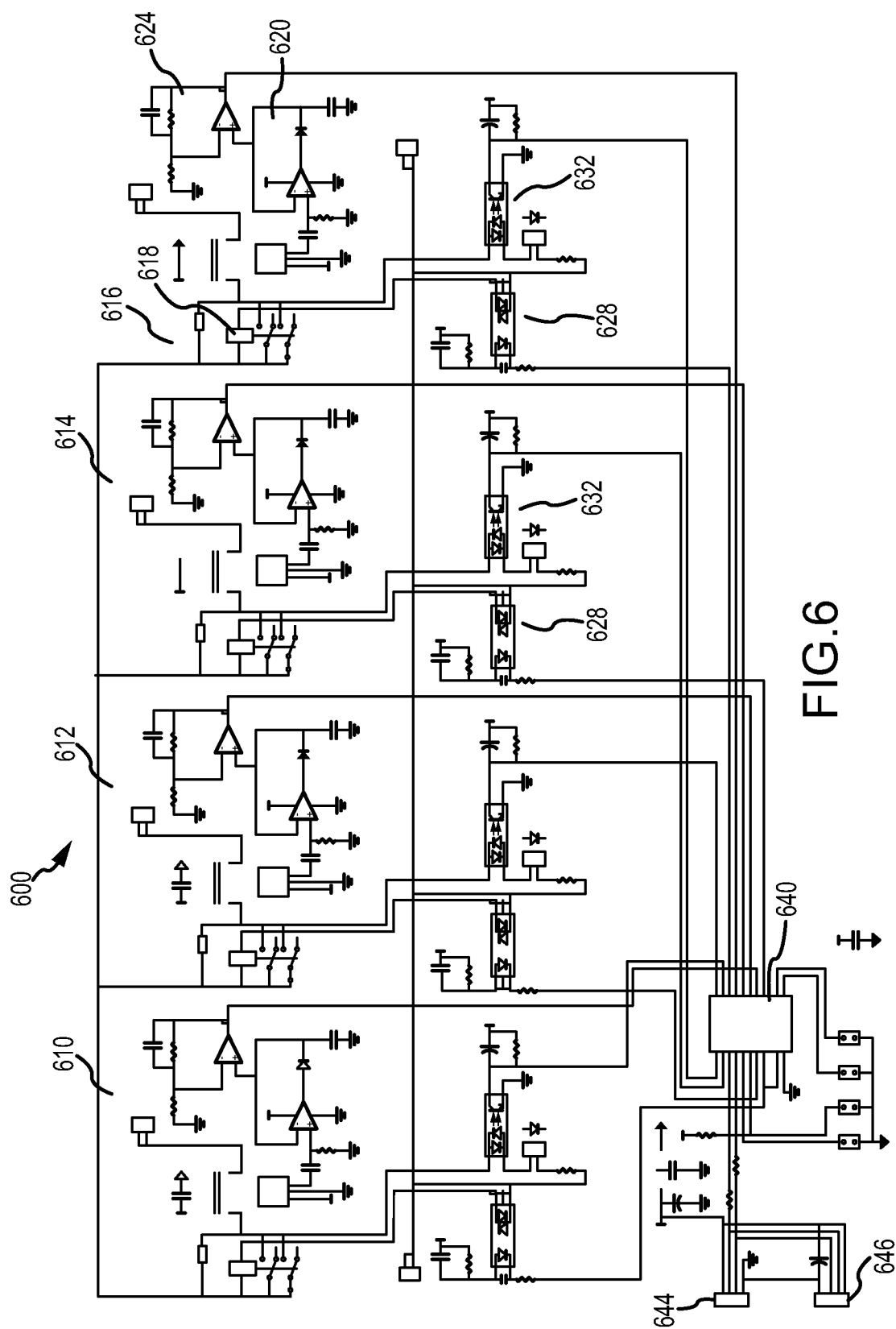
FIG. 6 is a schematic diagram of an exemplary intelligent power module, such as the intelligent power supply modules implemented by the transfer switch 100 of FIG. 1.

FIG. 6 is a schematic diagram of a power module 600 having four identical sections 610, 612, 614, 616 for controlling power outlets on a transfer switch according to an embodiment of the disclosed technology. The sections 610, 612, 614, 616 correspond to the four sections of power modules 402, 404, 406, 408 shown in FIG. 4. Each power module 402, 404, 406, 408 can provide power to a group of four power outlets, such the two groups of four outlets in branch 126 shown in FIG. 2. However, it is contemplated that other arrangements, such as one eight-section power module, can be used rather than two separate four-section modules.

An upper portion of each section 610, 612, 614, 616 includes a power control relay 618, a precision rectifier stage 620, and a gain stage 624. A lower portion of each section 610, 612, 614, 616 includes an opto-isolator switch 628 and opto-sensing element 632. Each section 610, 612, 614, 616 receives DC power through a connection to an I2C bus microcontroller 640, which is connected to a network personality module using connectors 644 and 646.

The opto-sensing elements 632 sense the voltage at the output of each section 610, 612, 614, 616 to determine whether power is being supplied to the output receptacles of section 610, 612, 614, 616. This information is then routed to microcontroller 640. Opto-sensing elements 632 also provide microcontroller 640 with information regarding the level of power being drawn by the power outlet (e.g., power outlets 120 of FIG. 1) associated with a section 610, 612, 614, 616.

Figure 7:
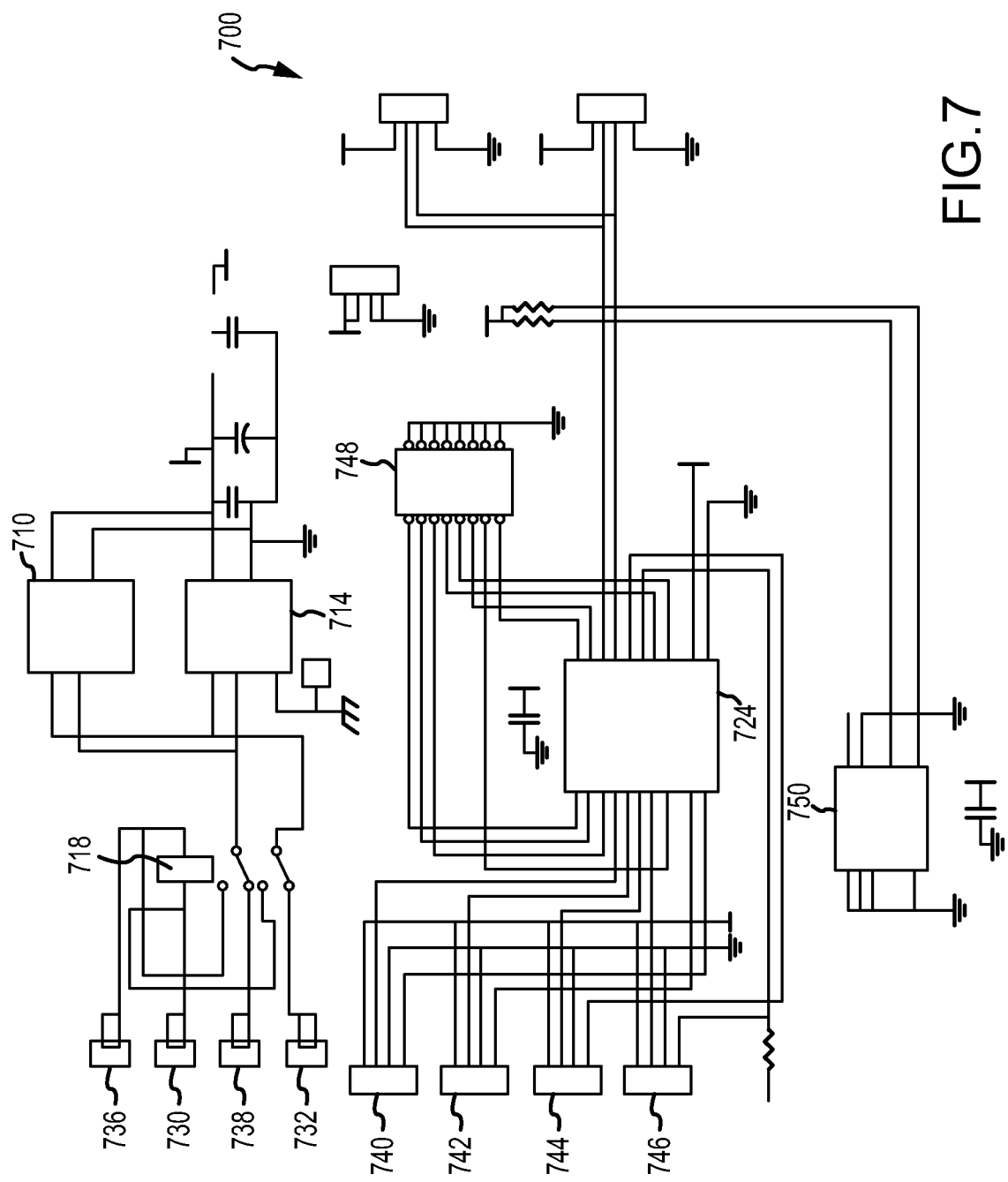
FIG. 7 is a schematic diagram of an exemplary IPT(PS3) power supply module, such as the IPT(PS3) power supply module implemented by the transfer switch 100 of FIG. 1.

FIG. 7 is a schematic diagram of an IPT(PS3) power supply module according to an embodiment of the disclosed technology. Multiple AC power sources 730 (line 1), 736 (neutral 1), 732 (line 2), and 738 (neutral 2) are switched via relay 718 for use as a small power transfer switch similar to the module discussed above in conjunction with FIG. 5. Power supply 710 or 714 converts AC input power to DC voltage to provide DC power to microcontroller 724. Connectors 740, 742, 744, 746 provide AC voltages corresponding to four true RMS current signals to controller 724. The controller 724 has an internal 4-to-1 multiplexer connected to a single A-to-D converter.

Jumper 748 is a configuration jumper that sends reports regarding the number of input feeds supported by the power transfer module, whether the power transfer module is operational, and the number of controllable outlets. All of these features may be configurable according to specifications set by a user. Non-volatile memory 750 stores information regarding operation of the controller 724.

Figure 8:
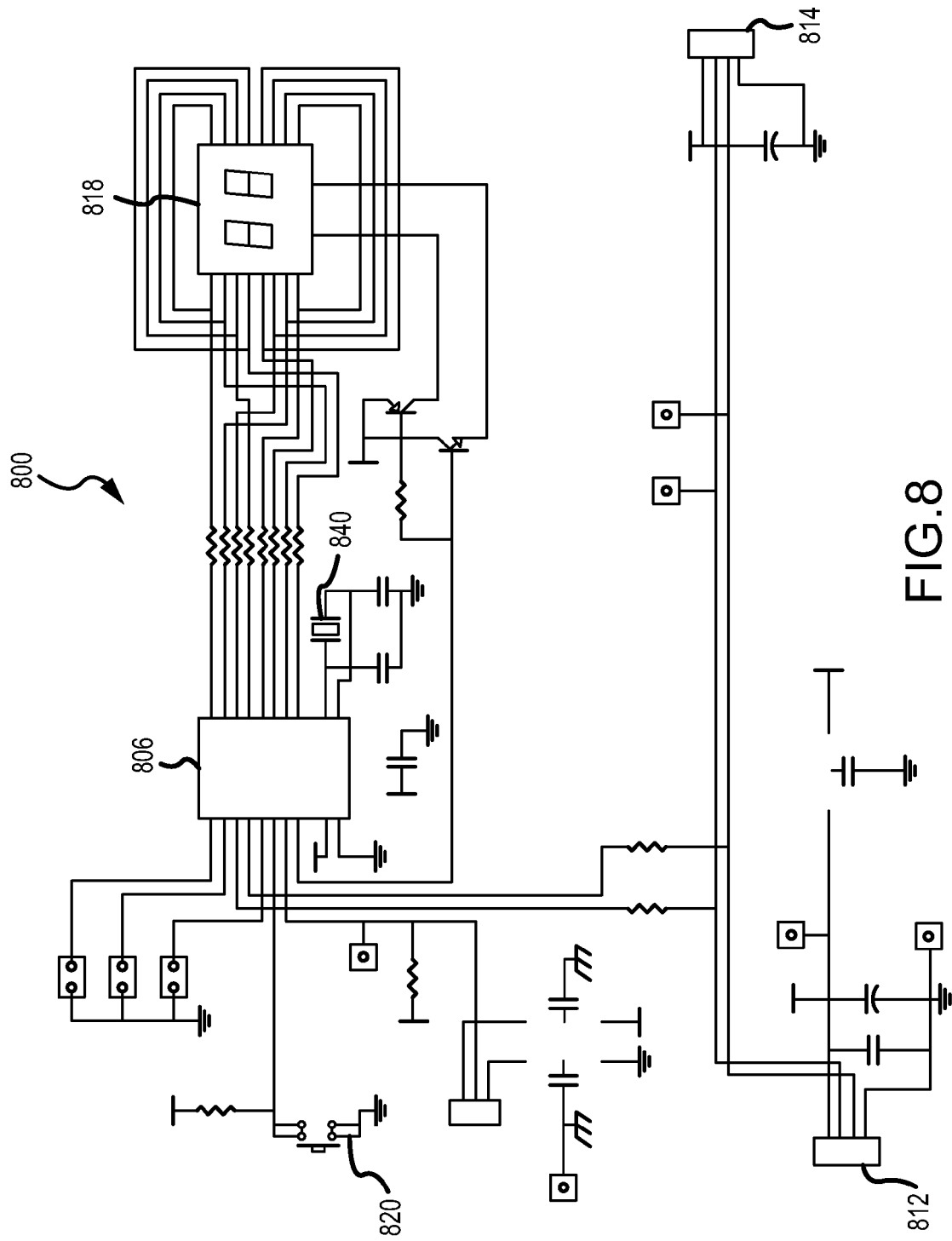
FIG. 8 is a schematic diagram of an exemplary R400 I2C-S bus display module, such as the R400 I2C-S bus display module implemented by the transfer switch 100 of FIG. 1.

FIG. 8 is a schematic diagram of an R400 I2C-S display module 800 according to an embodiment of the disclosed technology. An I2C controller 806 is connected to an IC bus through connectors 812, 814, communicates current information regarding power input feed current, and writes out the value to the display module 818 (e.g., display 130 of FIG. 1). Non-volatile memory of I2C controller 806 may be reset by pressing momentary contact switch 820 (e.g., momentary contact switch 170 of FIG. 1) for about 10-15 seconds. Momentary contact switch 820 may be password protected. An oscillator 840 is attached to I2C controller 806.

Figure 9:
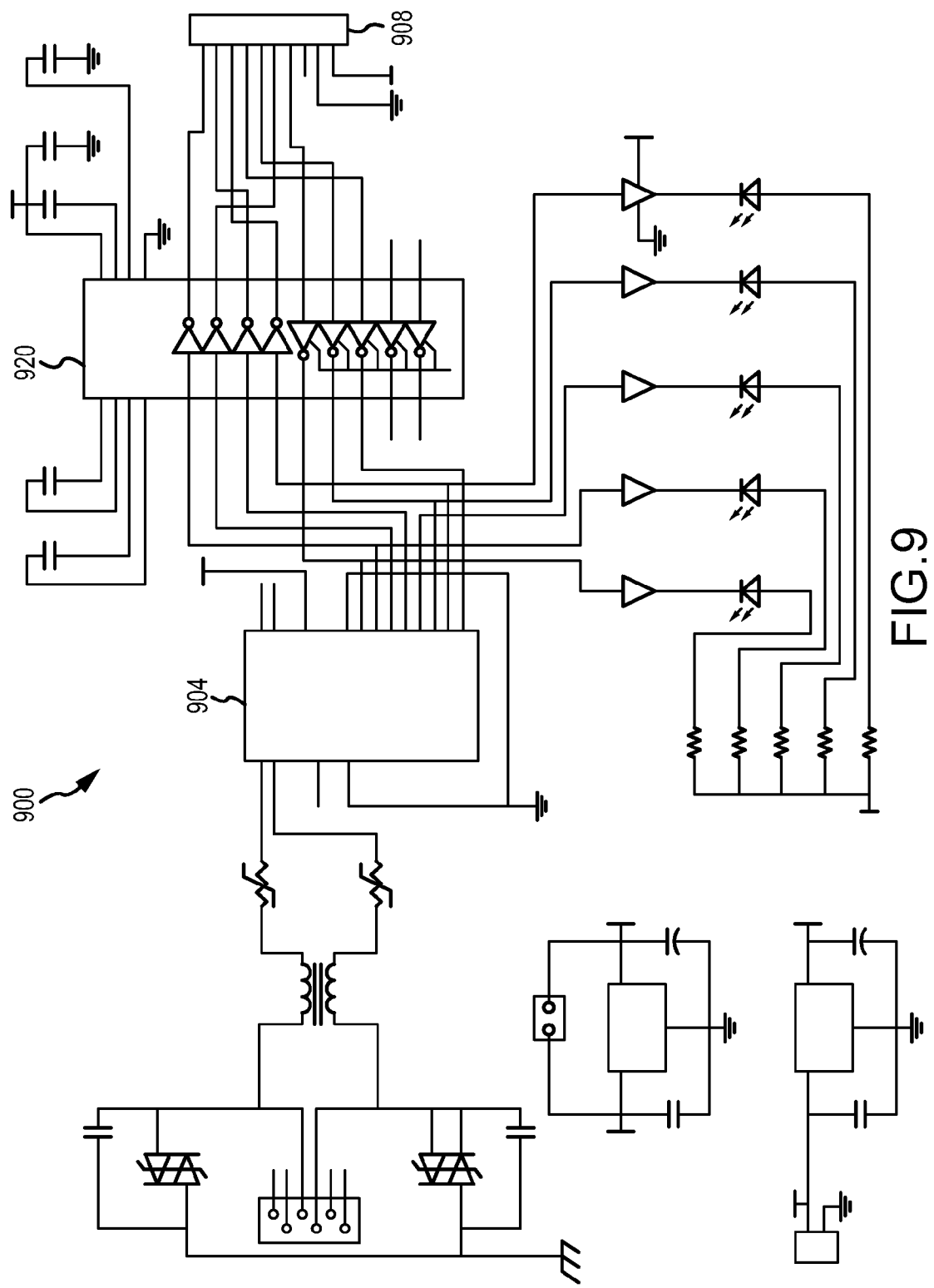
FIG. 9 is a schematic diagram of an embodiment of a modem carrier module, such as the modem carrier module implemented by the transfer switch 100 of FIG. 1.

FIG. 9 is a schematic diagram of a modem carrier module 900 that may be used with at least certain embodiments of the disclosed technology. A connection to modem chip 904 provides an out-of-band network connection to the transfer switch 100 of FIG. 1 via a telephone line. The modem connection is made by a tie-in to a serial port connector such as connector 908. Thus, a low-voltage DC interconnection can be obtained. Chip 920 is a driver for TTL conversion.

Figure 10:
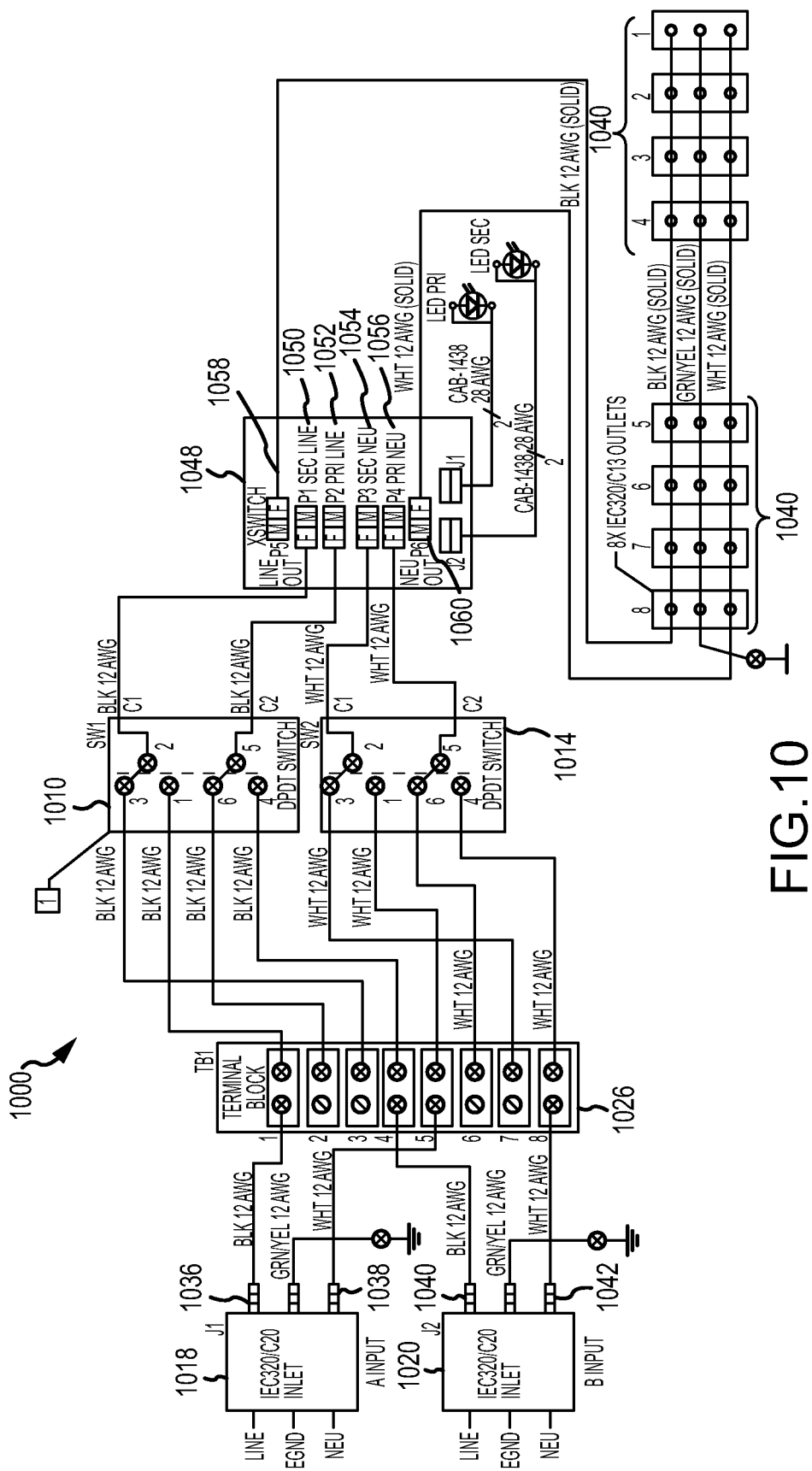
FIG. 10 is a schematic wiring diagram of a transfer switch, such as the exemplary transfer switch 101 of FIG. 1.

FIG. 10 illustrates a wiring diagram for a transfer switch 1000 (e.g., transfer switch 101 of FIG. 1) that may be used to manually select which input power source is the primary power source and which input power source is the secondary power source, as discussed above in conjunction with the primary select switch (e.g., primary select switch 180 of FIG. 1) located on an external surface of the transfer switch enclosure.

The transfer switch 1000 module is connected to external priority selection switches 1010, 1014. External priority selection switches 1010, 1014 are mechanically linked together (although not shown in the drawing) so as to not allow independent switching. External priority selection switches 1010, 1014 are mounted on the transfer switch module 1000.

In the embodiment shown in FIG. 10, switches 1010, 1014 are double-pole, double-throw switches each having pins 1, 6 connected, and pins 3, 4 connected, via terminal block 1026, to power sources 1018, 1020. Pins 1, 6 of switch 1010 are connected to pins 1, 2 of terminal block 1026 while pins 3, 4 of switch 1010 are connected to pins 3, 4 of terminal block 1026. Pins 1, 6 of switch 1014 are connected to pins 5, 6 of terminal block 1026 while pins 3, 4 of switch 1014 are connected to pins 7, 8 of terminal block 1026. Pin 1 from terminal block 1026 is connected to a line contact 1036 of source 1018 and pin 5 from terminal block 1026 is connected to a neutral contact 1038 of source 1018. Pin 4 from terminal block 1026 is connected to a line contact 1040 of source 1020 and pin 8 from terminal block 1026 is connected to a neutral contact 1042 of source 1020.

Switches 1010, 1014 are used for prioritizing input sources 1018, 1020 which are both fed through terminal block 1026 into transfer switch 1000. Terminal block 1026 provides internal wiring assistance between switches 1010, 1014 and input sources 1018, 1020. Transfer switch 1048 may be used to select the input source for outlets 1040.

A secondary line-in contact 1050 of transfer switch 1048 is connected to common pin 2 of switch 1010 while a primary line-in contact 1052 of transfer switch 1048 is connected to common pin 5 of switch 1010. A secondary neutral-in contact 1054 of transfer switch 1048 is connected to common pin 2 of switch 1014 while a primary neutral-in contact 1056 of transfer switch 1048 is connected to common pin 5 of switch 1014. A line-out contact 1058 and a neutral-out contact 1060 of transfer switch 1048 are connected to line and neutral contacts of power outlets 1040.

Figure 11:
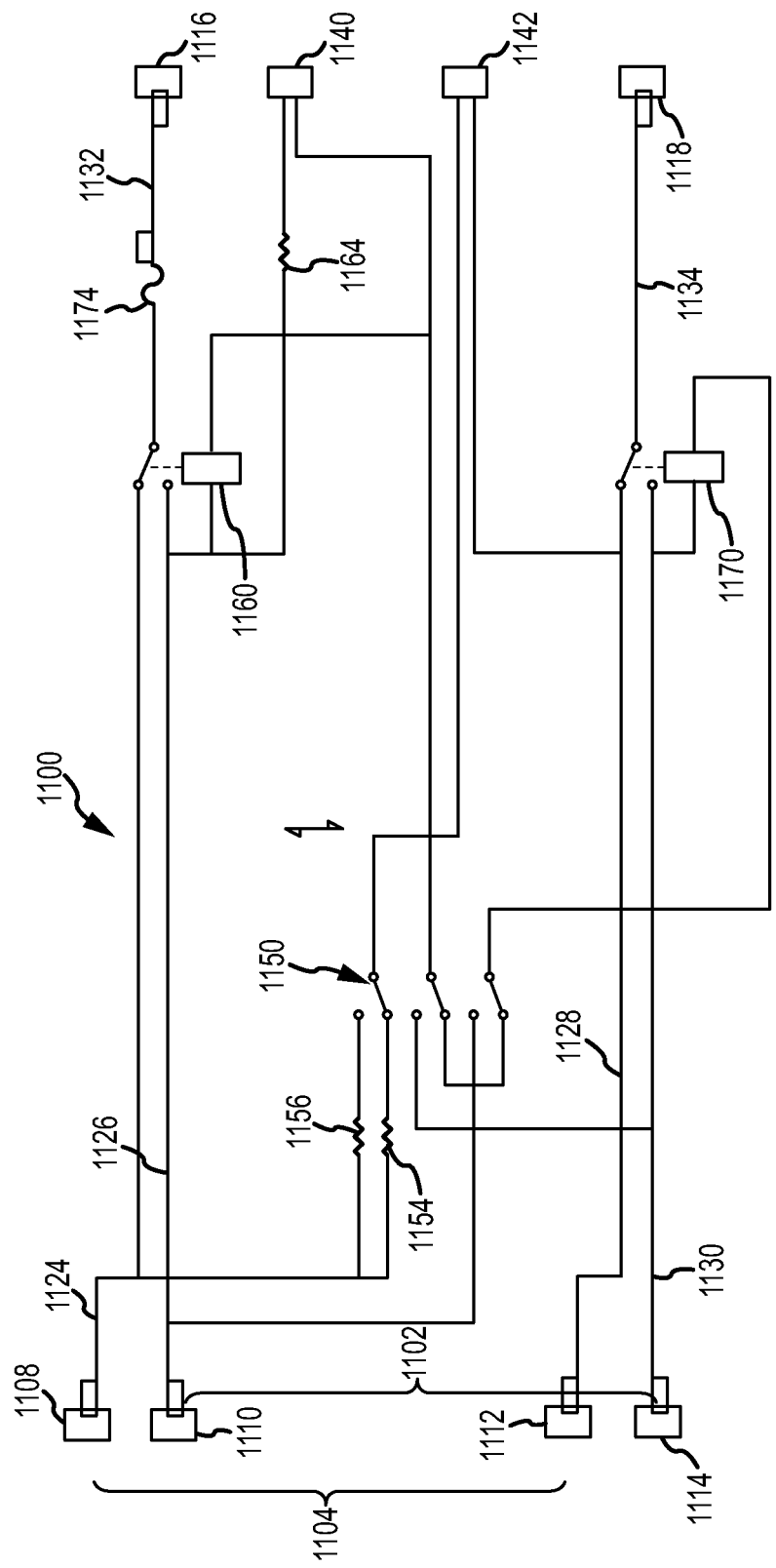
FIG. 11 is a schematic diagram of an exemplary automatic transfer switch circuit, such as can be implemented in either of the transfer switches of FIG. 1.

FIG. 11 is a schematic diagram of an exemplary automatic transfer switch circuit, such as can be implemented in either of the transfer switches 100 or 101 of FIG. 1. FIG. 11 illustrates an embodiment of a transfer switch 1100 that may be used to transfer outlets connected to a first power source 1102 to a second power source 1104. In this embodiment, there is no load sharing between power sources 1102, 1104, all outlets are attached to one power source.

First power source 1102 includes a first line-in 1126 connected to a first line-in connector 1110. First power source 1102 includes a first neutral-in 1130 connected to a first neutral-in connector 1114. Second power source 1104 includes a second line-in 1124 connected to a second line-in connector 1108. Second power source 1104 includes a second neutral-in 1128 connector to a second neutral-in connector 1112.

As shown in FIG. 11, the transfer switch 1100 is shown operating under the second power source 1104. Secondary line-in connector 1108 of power source 1104 is connected to a normally-closed pin 7 of a triple-pole, double-throw switch 1150 through resistor 1154 and to a normally-open pin 9 through resistor 1156. Common pin 8 of the switch 1150 is connected to pin 1 of a connector 1142 for a display (not shown).

The first power source 1102 is connected to pins 1, 3, and 4 of switch 1150. Source 1102 is also connected to normally-open pin 4, coil pin 3 of relay 1160, and pin 1 of connector 1140 for a display (not shown) through resistor 1164. Connector 1112 of source 1104 is connected to normally-closed pin 5 of relay 1170 and pin 2 of connector 1142, which are coupled through a common pin 1 of relay 1170 to a neutral-out connector 1118. Connector 1114 is connected to pin 6 of switch 1150 and pin 3 of relay 1170.

Connector 1108 of source 1104 is coupled to a line-out on connecter 1116 through normally-closed pin 5 of relay 1160 through common pin 1 and fuse 1174. Fuse 1174 in the transfer switch 1100 protects against power failures. In addition, common pin 5 of switch 1150 is coupled to pin 2 of connector 1140 and to coil pin 2 of relay 1160. Common pin 2 of switch 1150 is connected to coil pin 2 of relay 1170. The dashed lines above the relays 1160, 1170 indicate that the position of the relays 1160, 1170 can be up or down.

If the source 1102 is connected to a load through fuse 1174 as shown, source 1104 will not supply power to the load. If source 1104 supplies power to a load connected through fuse 1174 thereto, source 1102 will not supply power to the load. Line-out to connector 1116 and neutral-out to connector 1118 will receive current from either source 1102, 1104 depending on the setting of switch 1150. If the leafs of switch 1150 are arranged in a down position as shown, the relays 1160, 1170 are being supplied by source 1104, and source 1102 will be disconnected from the load. Alternatively, if the leafs of switch 1150 are arranged in an up position (not shown), the relays 1160, 1170 are being supplied by source 1102, and source 1104 will be disconnected from the load.

As shown in FIG. 11, secondary line-in connector 1108 is operating; current is flowing through resistor 1154 to light an LED indicator connected to connector 1142; a line-out to connector 1116 is provided by a connection between pins 1 and 5 of relay 1160; and a neutral-out to connector 1118 is provided by a connection between pins 1 and 5 of relay 1170. Together connectors 1116 and 1118 feed a load attached to the transfer switch 1100.

If secondary source 1104 fails, or the user otherwise desires, the load can be transferred to primary source 1102. When the switch 1150 is so activated, switch 1150 is switched such that pin 8 is connected to pin 9; pin 6 is connected to pin 5; and pin 3 is connected to pin 2. Current from source 1102 will flow through a connection between pins 2 and 3 of switch 1150 to pull down relay 1170 thereby connecting pins 1 and 4 to connect primary neutral 1130 from connector 1114 to neutral-out 1118. Primary line connector 1110 will flow through a connection between pins 5 and 6 of switch 1150 to pull down relay 1160, thereby connecting pins 1 and 4 to connect primary line in 1126 to connector 1116 through fuse 1174. Primary line connector 1110 will connect through the coil pins 2 and 3 at relay 1160 and through pins 5 and 6 of switch 1150 to primary neutral thereby switching relay 1160 to connect pins 1 and 4 thereof so as to provide primary line-in from connector 1110 to 1112 via fuse 1174.

Figure 12A:
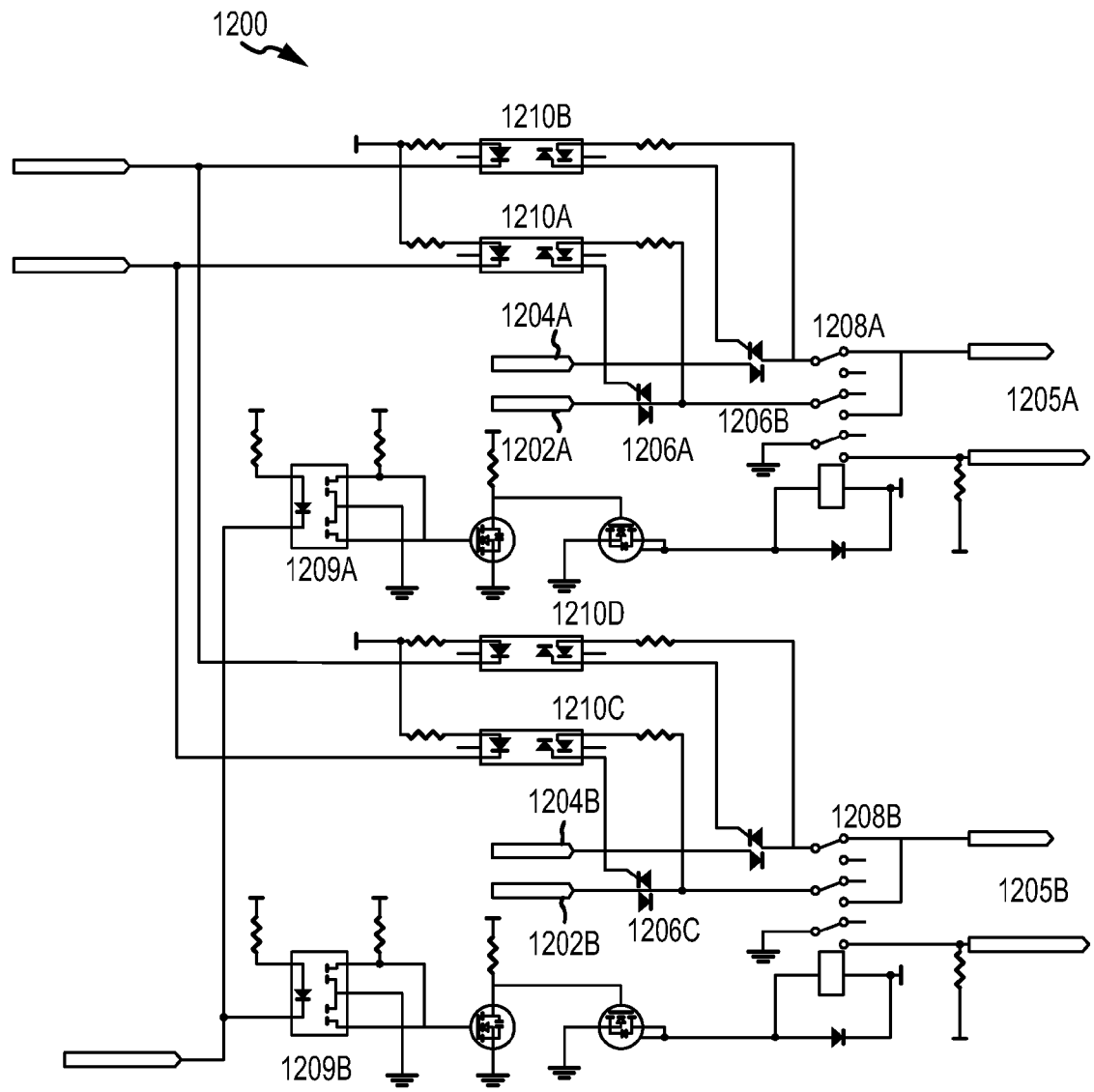
FIG. 12 is a schematic diagram of an automatic transfer switch according to a first embodiment of the disclosed technology.
Figure 12B:
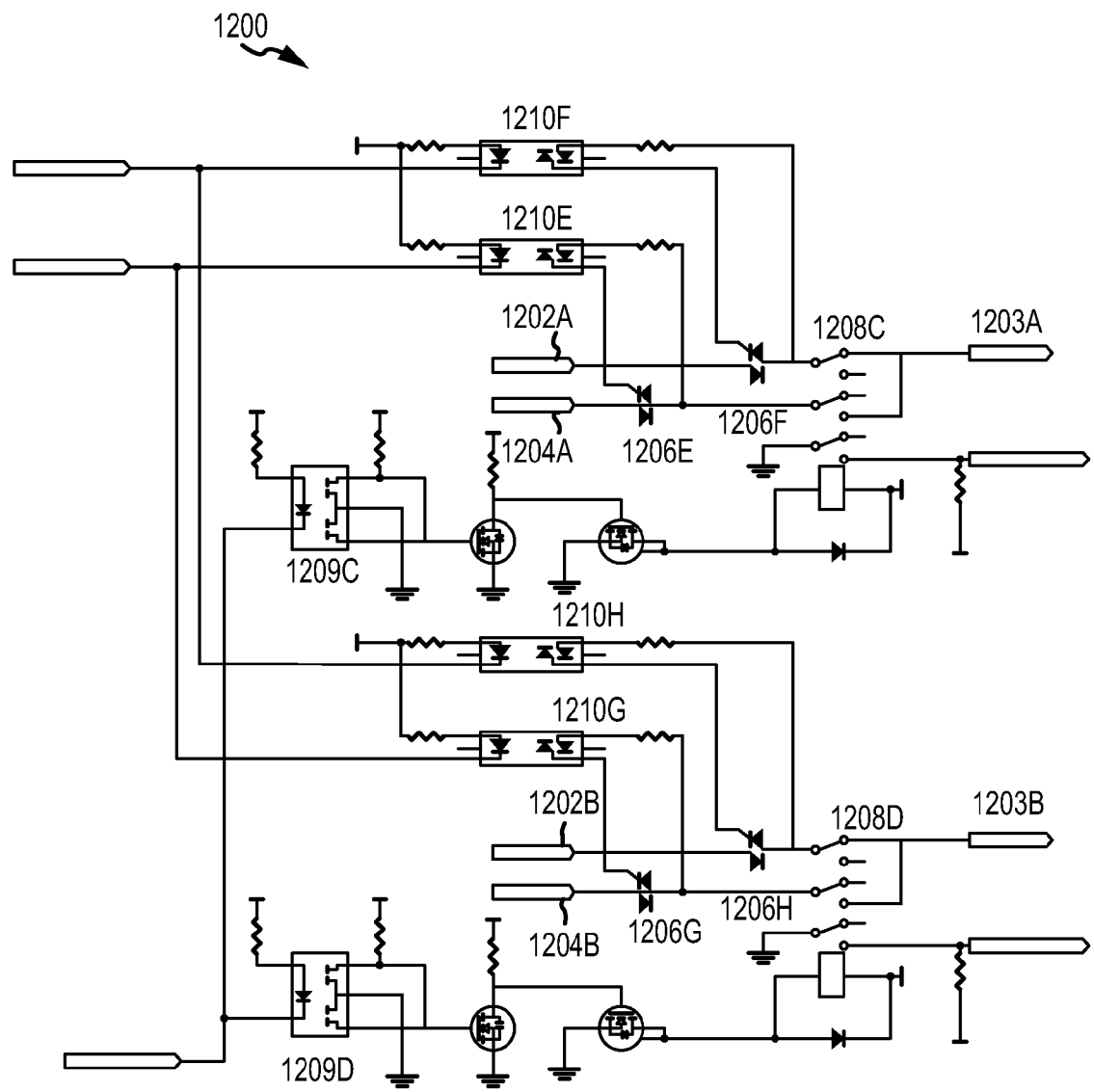
Figure 12C:
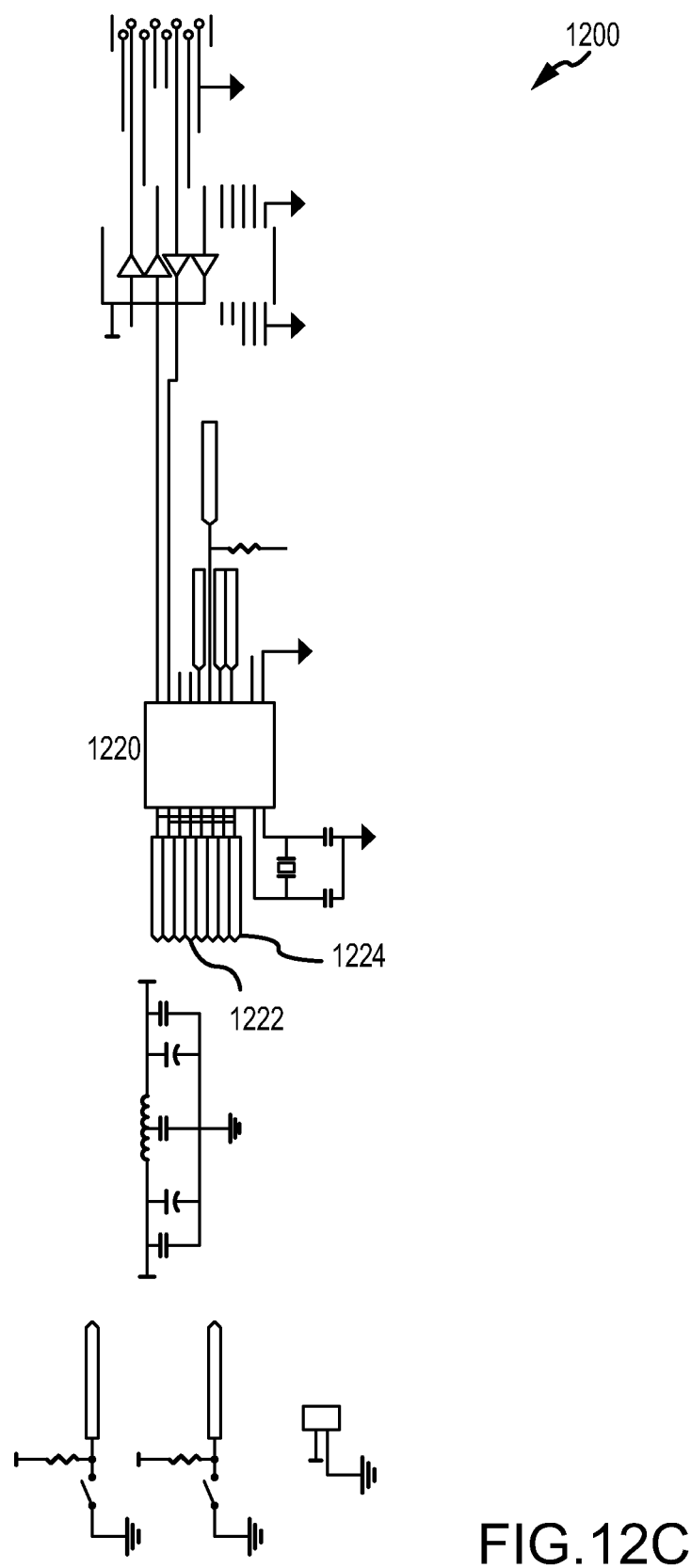

FIG. 12 illustrates a first embodiment of an automatic transfer switch 1200 that is connected to a first power source (as shown by power connections 1202A-B) and a second power source (as shown by power connections 1204A-B). Automatic transfer switch 1200 provides power to electronic devices through a first power outlet (as shown by power connections 1203A-B) and a second power outlet (as shown by power connections 1205A-B). Solid state switches, such as triacs 1206A-H, along with switching mechanisms, such as the relay switches 1208A-D, dictate which power source will ultimately provide power to the two power outlets through power connections 1203A-B and 1205A-B. In the example, relay switches 1208A-D are triple-pole, double-throw switches. Relay switches 1208A-D are controlled by relay drivers 1209A-D, respectively. In the example, the input coil voltage to the relay switches 1208A-D is 12V. In some examples, however, the voltage can be overdriven (e.g., 15V) to decrease switchover time.

A microprocessor 1220, such as an 8-bit 8051-derivative microprocessor, receives input signals 1222 and 1224 that tell it when the first power source or the second power source, respectively, has experienced an interruption. The microprocessor 1220 is also connected to the triacs 1206A-H through opto-isolators 1210A-H.

In one example, the first power source (through power connections 1202A-B) experiences an interruption. Signals are sent to the microprocessor 1220 informing it of the interruption, and microprocessor 1220 responds by driving control signals that first turn off triacs 1206F and 1206H. Once triacs 1206F and 1206H have been turned off for a brief time (e.g., 8 milliseconds), relays 1208C and 1208D are then switched from their first position (e.g., a de-energized relaxed state) to their second position.

Once the new connection has been established, the microprocessor 1220 sends control signals to triacs 1206E and 1206G to turn them on, thereby allowing power to the first power outlet (through power connections 1203A and 1203B) to now come from the second power source (through power connections 1204A and 1204B) rather than from the first power source (through power connections 1202A and 1202B).

Use of relays 1208A-D ensures that the connection to the failed input source has been broken before a connection is made with the active input source. Whereas the triacs 1206A-H are placed in series with the relays 1208A-D in automatic transfer switch 1200, the embodiment illustrated in FIG. 13 uses triacs to shunt the relay contacts.

In some examples, the total switching time can be roughly 15-20 milliseconds, though this should not cause any problems since most electrical equipment that would receive power through either of the power outlets can wait two cycles (e.g., 36-40 milliseconds) during a power interruption.

Figure 13A:
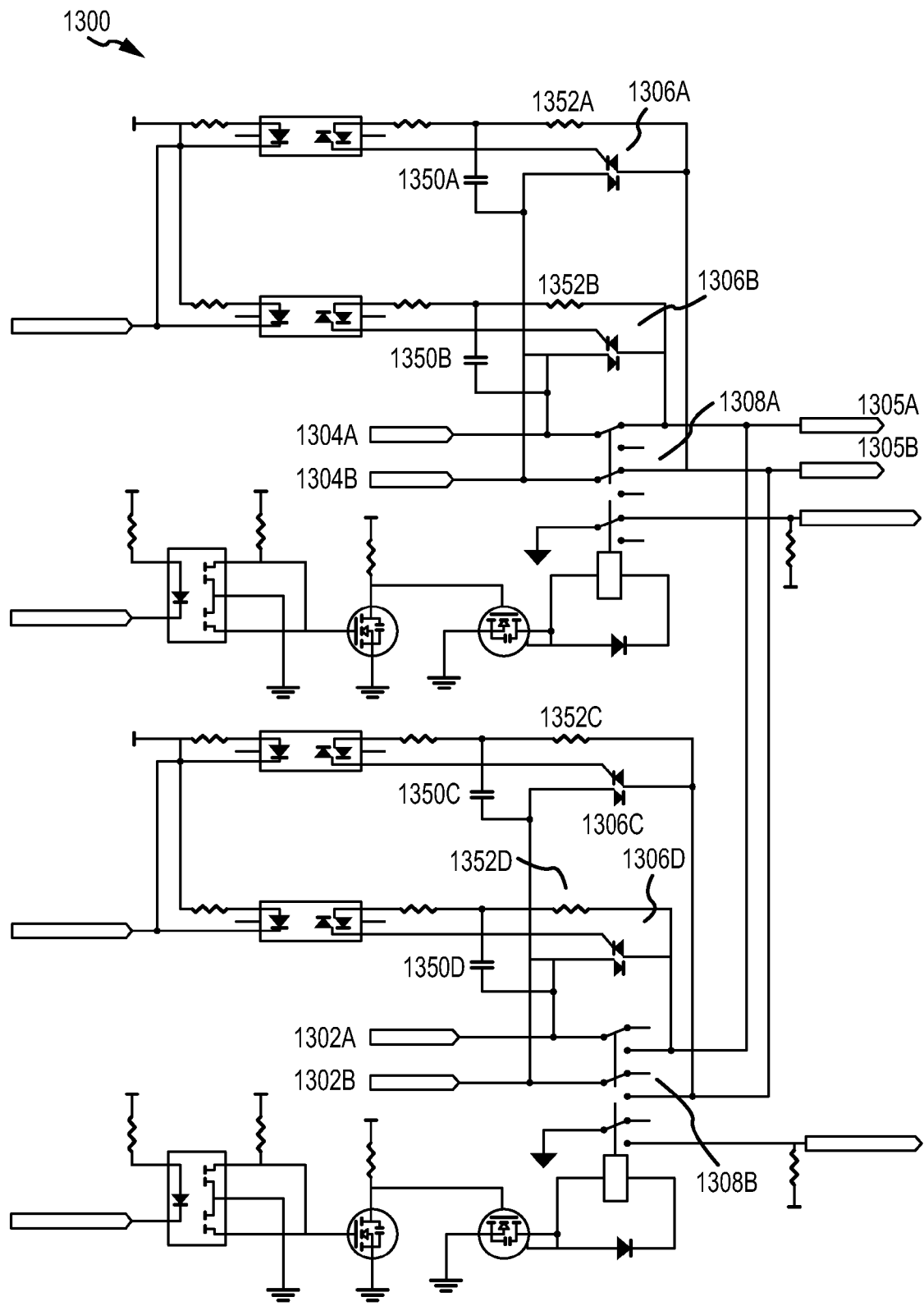
FIG. 13 is a schematic diagram of an automatic transfer switch according to a second embodiment of the disclosed technology.
Figure 13B:
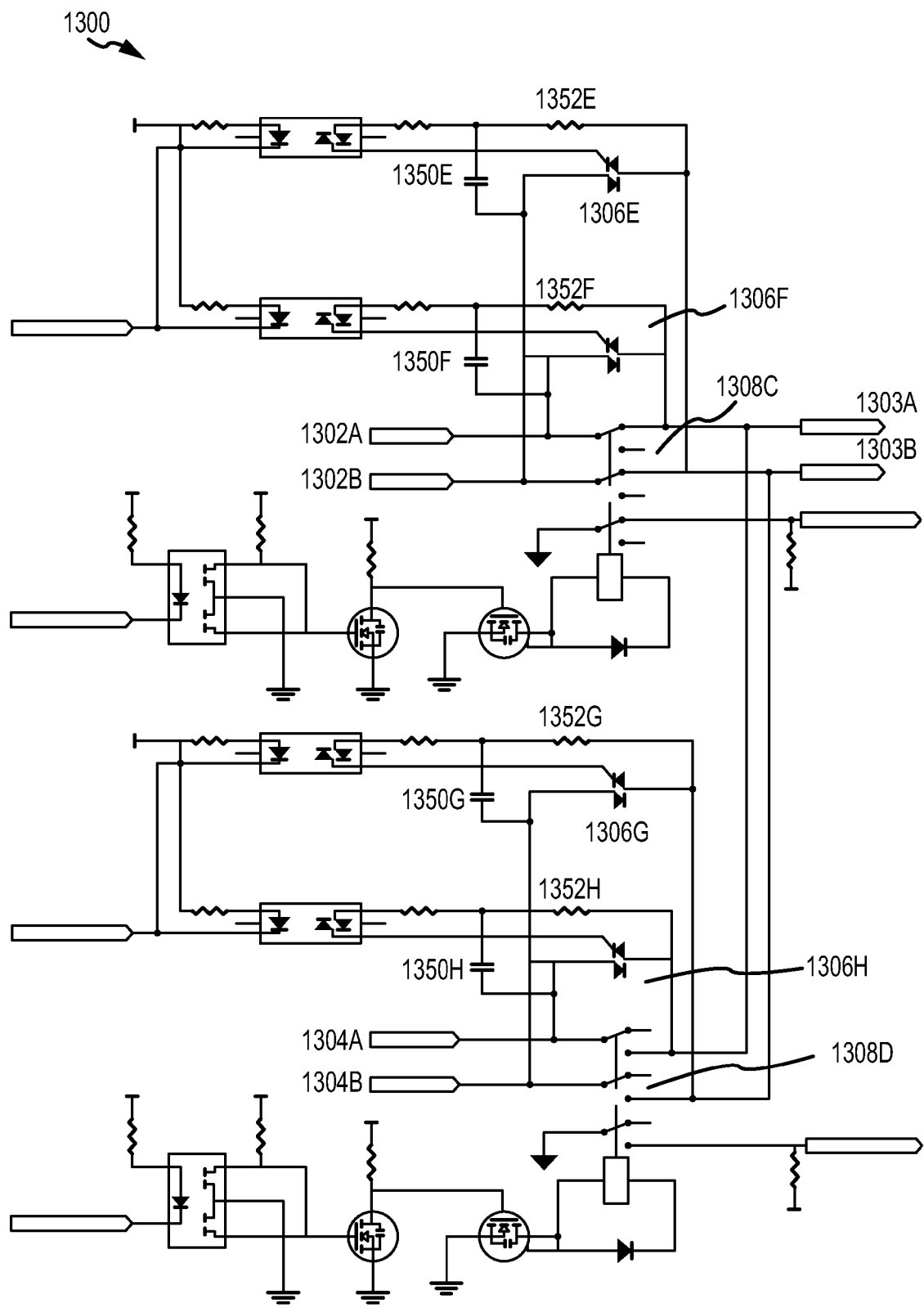
Figure 13C:
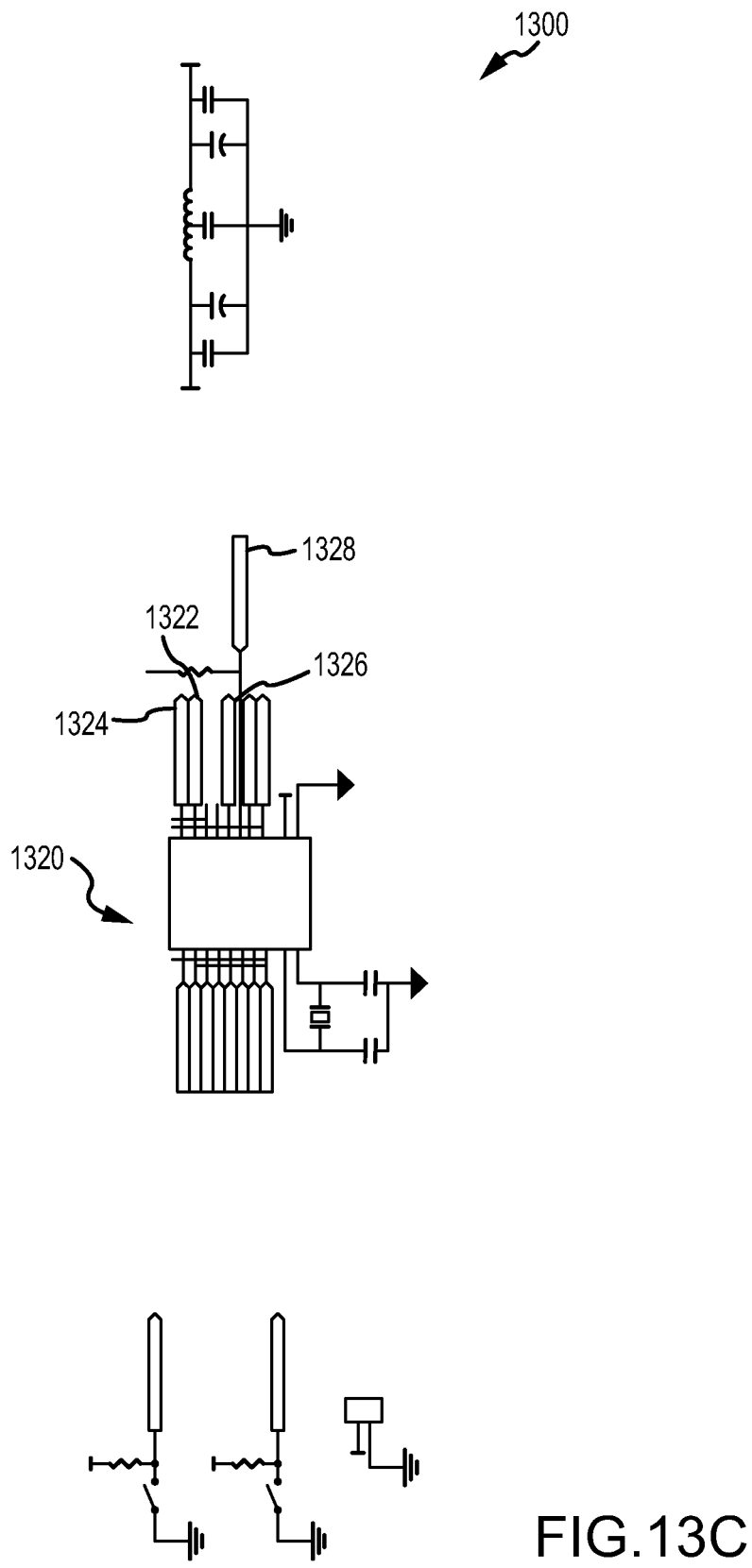

FIG. 13 illustrates a second embodiment of an automatic transfer switch 1300 that is connected to a first power source (as shown by power connections 1302A-B) and a second power source (as shown by power connections 1304A-B). Automatic transfer switch 1300 provides power to electronic devices through a first power outlet (as shown by power connections 1303A-B) and a second power outlet (as shown by power connections 1305A-B). Triacs 1306A-B are in parallel with relay switch 1308A, triacs 1306C-D are in parallel with relay switch 1308B, triacs 1306E-F are in parallel with relay switch 1308C, and triacs 1306G-H are in parallel with relay switch 1308D. The triac/relay parallel combinations dictate which of the two power sources will ultimately provide power to each of the two power outlets through power connections 1303A-B and 1305A-B.

In the example, an interruption to the first power source occurs, resulting in a significant reduction or complete loss of power provided through power connections 1302A-B. A microprocessor 1320 receives input signal 1322 informing it of the interruption. The microprocessor 1320 issues commands that cause triacs 1306E and 1306F to turn on, thereby shunting current around the contacts of relay 1308C. After a brief delay (e.g., 8 milliseconds), the microprocessor 1320 then issues a command to cause relay switch 1308C to switch positions.

Once the existing contact is broken in relay switch 1308C and confirmed to the microprocessor 1320 (e.g., through signal 1326), the microprocessor 1320 issues commands to turn off triacs 1306E and 1306F. After a brief delay (e.g., 8 milliseconds), the microprocessor 1320 then issues commands to turn on triacs 1306G and 1306H.

After a brief delay (e.g., 8 milliseconds), the microprocessor 1320 issues a command to turn on relay switch 1308D. Once the switchover is complete and such connection is confirmed to the microprocessor 1320 (e.g., through signal 1328), triacs 1306G and 1306H are turned off and the power now flows from the second power source through power connections 1304A-B to the first power outlet through power connections 1303A-B.

The addition of snubber circuitry (e.g., capacitors 1350A-H and resistors 1352A-H) helps prevent against self-commutation of the triacs 1306A-H.

Novel circuitry such as that in FIGS. 12-13 is advantageous because less than all of the outlets (e.g., half of the outlets) derive their power from a single power source. Thus, in the event of a power source interruption, less than all of the outlets will be switched over to an alternate power source, as opposed to all the outlets, as is currently done in the industry. This results in several advantages, such as less wear on the implemented relays and less droop on the voltage going to the outlets.

It can thus be understood that certain embodiments provide an automatic AC transfer switch that provides load balancing. Under normal operating conditions a plurality of power outlets of the transfer switch are supplied with power from a plurality of power sources. If one of the power sources fails, the power outlets supplied by the failed source are transferred to one or more of the remaining power sources. In this way, less than the full load of the transfer switch is transferred between power sources in the event a power source fails.

It can also be understood that the novel circuitry as exemplified in FIGS. 12-13 can be implemented to provide faster and more reliable power switching than prior art circuitry.

In certain embodiments, transfer switches have a configurable input voltage range. For example, the transfer switch may have a module containing factory serviceable jumpers that allow the input feed voltage range to be configured prior to shipment. The transfer switch may have a user selectable operating range, such as by means of a switch (e.g., voltage range switch 188 of FIG. 1). A configurable operating range allows a single transfer switch to be used for different input feed voltage ranges, thus potentially reducing inventory stock, manufacturing costs, reducing user expense, or user inconvenience.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims We therefore claim as our invention all that comes within the scope and spirit of these claims.

What is claimed is:

1. A transfer switch with arc suppression circuitry, the transfer switch comprising:
   at least one microprocessor;
   a first solid state switch and a first relay in parallel, wherein the at least one microprocessor is in switch control communication with the first solid state switch and the first relay, and wherein the first solid state switch and the first relay are connectable to a first outlet;
   a first power source input connectable to a first power source, the first power source input in power supply communication with the first solid state switch and the first relay;
   a second solid state switch and a second relay in parallel, wherein the at least one microprocessor is in switch control communication with the second solid state switch and the second relay, and wherein the second solid state switch and the second relay are connectable to the first outlet;
   a second power source input connectable to a second power source, the second power source input in power supply communication with the second solid state switch and the second relay; and
   a non-transitory memory having instructions stored thereon that when executed by the at least one microprocessor cause the at least one microprocessor, upon detection of an interruption in the first power source to the first power source input resulting in a disruption of power to the first outlet, to switch the first outlet over to the second power source input that was not previously supplying power to the first outlet by:
   activating the first solid state switch to shunt current around the first relay while opening the first relay;
   activating the second solid state switch while closing the second relay to supply power from the second power source to the first outlet through the second solid state switch; and
   deactivating the first and second solid state switches so that the second relay channels power to the first outlet.

2. The transfer switch of claim 1, wherein the first and second solid state switches are triacs.

3. The transfer switch of claim 1, further comprising:
   a third solid state switch and a third relay in parallel, wherein the at least one microprocessor is in switch control communication with the third solid state switch and the third relay, and wherein the third solid state switch and the third relay are connectable to a second outlet;
   a fourth solid state switch and a fourth relay in parallel, wherein the at least one microprocessor is in switch control communication with the fourth solid state switch and the fourth relay, and wherein the fourth solid state switch and the fourth relay are connectable to the second outlet.

4. The transfer switch of claim 3, wherein the third and fourth solid state switches are triacs.

5. A transfer switch with arc suppression circuitry, the transfer switch comprising:
   a first power source input configured to receive power from a first power source;
   a second power source input configured to receive power from a second power source;
   a first relay;
   a second relay;
   a first solid state switch in parallel with the first relay, wherein the first relay is electrically connected to the first power source input and initially, when in a first position, is operative to direct power from the first power source input to one or more outlets;
   a second solid state switch in parallel with the second relay, wherein the second relay is electrically coupled with the second power input and the one or more outlets;
   means for automatically monitoring for interruptions in the first power source; and
   at least one microprocessor programmed to control the first and second solid state switches and the first and second relays, wherein in response to an interruption of power from the first power source to the first power source input, the at least one microprocessor is further programmed to:
   cause the first solid state switch to energize;
   cause the first relay to switch from the first position to a second position; and
   cause the second solid state switch to energize, thereby allowing the second solid state switch to provide the power received by the second power input to the one or more outlets.

6. The transfer switch of claim 5, further comprising a first electrical load initially configured to receive power from the first power source through one of the first solid state switch and the first relay.

7. The transfer switch of claim 1, wherein the non-transitory memory has instructions stored thereon that when executed by the at least one microprocessor further cause the at least one microprocessor to confirm that the first relay is opened before deactivating the first solid state switch.

8. The arc suppression circuit of claim 7, wherein the non-transitory memory has instructions stored thereon that when executed by the at least one microprocessor further cause the at least one microprocessor to confirm that the second relay is closed before deactivating the second solid state switch.

9. The transfer switch of claim 1, wherein the first power source and the second power source are two different phases of a three phase power source.

10. A power distribution unit comprising:
a housing;
a first power input and a second power input each penetrating the housing;
a plurality of power outlets disposed on a surface of the housing; and
circuitry enclosed in the housing interconnecting the first power input and the second power input with the plurality of power outlets, wherein the circuitry includes a transfer switch having an arc suppression circuit, the transfer switch comprising:
at least one processing device;
a first solid state switch and a first relay in parallel, wherein the at least one processing device is communicably coupled with the first solid state switch and the first relay, and wherein the first solid state switch and the first relay are connectable to the plurality of power outlets;
a first power source input connectable to the first power input, the first power source input in power supply communication with the first solid state switch and the first relay;
a second solid state switch and a second relay in parallel, wherein the at least one processing device is communicably coupled with the second solid state switch and the second relay, and wherein the second solid state switch and the second relay are connectable to the plurality of power outlets;
a second power source input connectable to the second power input, the second power source input in power supply communication with the second solid state switch and the second relay; and
a non-transitory memory having instructions stored thereon that when executed by the at least one processing device cause the at least one processing device, upon detection of an interruption in power supplied through the first power input, to:
temporarily activate the first solid state switch to shunt current around the first relay while opening the first relay;
temporarily activate the second solid state switch while closing the second relay to supply power from a second power source through the second power input; and
deactivate the first and second solid state switches so that the second power source is providing power through the second relay to the plurality of power outlets.

11. The power distribution unit of claim 10, further comprising a communication port to communicate information to, or receive information from, other devices.

12. The power distribution unit of claim 10, wherein the first and second solid state switches are triacs.

13. The power distribution unit of claim 10, further comprising at least one selection device allowing a user to select a nominal voltage range for an operating voltage of the first power input and the second power input.

14. The power distribution unit of claim 10, further comprising one or more displays located on the housing.

15. The power distribution unit of claim 10, wherein the non-transitory memory has instructions stored thereon that when executed by the at least one processing device further cause the at least one processing device to confirm that the first relay is opened before deactivating the first solid state switch.

16. The power distribution unit of claim 15, wherein the non-transitory memory has instructions stored thereon that when executed by the at least one processing device further cause the at least one processing device to confirm that the second relay is closed before deactivating the second solid state switch.

17. The power distribution unit of claim 10, wherein the first power source and the second power source are two different phases of a three phase power source.

18. A method to transfer one or more electrical loads between two sources of power using a transfer switch having a first solid state switch and a first relay in parallel, a first source of power, a second solid state switch and a second relay in parallel, and a second source of power, the method comprising:
receiving an indication of an interruption in power supplied by the first source of power;
temporarily activating, upon receiving the indication of the interruption in power supplied by the first source of power, the first solid state switch to shunt current around the first relay while opening the first relay;
temporarily activating the second solid state switch while closing the second relay to provide power from the second source of power; and
deactivating the first and second solid state switches so that the second source of power is providing power to one or more electrical loads attached to one or more power outlets.

19. The method of claim 18, wherein there is a minimum delay before deactivating the first solid state switch.

20. The method of claim 19, wherein the minimum delay is less than eight milliseconds.

21. The method of claim 18, further comprising confirming that the first relay is opened before deactivating the first solid state switch.

22. The method of claim 18, further comprising confirming that the second relay is closed before deactivating the second solid state switch.

23. The method of claim 18, wherein the interruption in power supplied by the first power source is a loss of power.

24. The method of claim 23, further comprising confirming that the first relay is opened before deactivating the first solid state switch.

25. The method of claim 24, further comprising confirming that the second relay is closed before deactivating the second solid state switch.

26. The method of claim 18, wherein the first power source and the second power source are two different phases of a three phase power source.

27. A transfer switch with arc suppression circuitry, comprising:
at least one microprocessor;
a first solid state switch and a first relay in parallel, wherein the at least one microprocessor is in switch control communication with the first solid state switch and the first relay, and wherein the first solid state switch and the first relay are connectable to an outlet;
a first power source input connectable to a first power source, the first power source input in power supply communication with the first solid state switch and the first relay;

a second solid state switch and a second relay in parallel, wherein the at least one microprocessor is in switch control communication with the second solid state switch and the second relay, and wherein the second solid state switch and the second relay are connectable to the outlet;

a second power source input connectable to a second power source, the second power source input in power supply communication with the second solid state switch and the second relay; and a non-transitory memory having instructions stored thereon that when executed by the at least one microprocessor cause the at least one microprocessor, upon detection of an interruption in the first power source, to, in order:
  i. activate the first solid state switch to shunt current around the first relay;
  ii. open the first relay;
  iii. deactivate the first solid state switch after the first relay is opened;
  iv. activate the second solid state switch;
  v. close the second relay; and
  vi. deactivate the second solid state switch after the second relay is closed so that the second relay channels power to the outlet.

28. The transfer switch of claim 27, wherein the first and second solid state switches are triacs.

29. The transfer switch of claim 27, wherein the non-transitory memory has instructions stored thereon that when executed by the at least one microprocessor further cause the at least one microprocessor to confirm that the first relay is opened before deactivating the first solid state switch.

30. The transfer switch of claim 29, wherein the non-transitory memory has instructions stored thereon that when executed by the at least one microprocessor further cause the at least one microprocessor to confirm that voltage from the second power source is available at the outlet before deactivating the second solid state switch.

31. The transfer switch of claim 30, wherein the non-transitory memory has instructions stored thereon that when executed by the at least one microprocessor further cause the at least one microprocessor to impose a minimum delay before deactivating the first solid state switch.

32. The transfer switch of claim 31, wherein the minimum delay is less than eight milliseconds.

33. The transfer switch of claim 27, wherein the first power source and the second power source are two different phases of a three phase power source.

34. A transfer switch with arc suppression circuitry, comprising:
at least one microprocessor;
a first solid state switch and a first relay in parallel, wherein the at least one microprocessor is in switch control communication with the first solid state switch and the first relay, and wherein the first solid state switch and the first relay are connectable to an outlet;
a first power source input connectable to a first power source, the first power source input in power supply communication with the first solid state switch and the first relay;
a second solid state switch and a second relay in parallel, wherein the at least one microprocessor is in switch control communication with the second solid state switch and the second relay, and wherein the second solid state switch and the second relay are connectable to the outlet;

a second power source input connectable to a second power source, the second power source input in power supply communication with the second solid state switch and the second relay; and a non-transitory memory having instructions stored thereon that when executed by the at least one microprocessor cause the at least one microprocessor, upon detection of an interruption in the first power source, to:
  temporarily activate the first solid state switch to shunt current around the first relay while opening the first relay;
  temporarily activate the second solid state switch while closing the second relay so that the second relay channels power to the outlet.

35. The transfer switch of claim 34, wherein the first and second solid state switches are triacs.

36. The transfer switch of claim 34, wherein the non-transitory memory has instructions stored thereon that when executed by the at least one microprocessor further cause the at least one microprocessor to confirm that the first relay is opened before deactivating the first solid state switch.

37. The transfer switch of claim 36, wherein the non-transitory memory has instructions stored thereon that when executed by the at least one microprocessor further cause the at least one microprocessor to confirm that the second power source is providing power to the outlet before deactivating the second solid state switch.

38. The transfer switch of claim 37, wherein the non-transitory memory has instructions stored thereon that when executed by the at least one microprocessor further cause the at least one microprocessor to impose a minimum delay before deactivating the first solid state switch.

39. The transfer switch of claim 38, wherein the minimum delay is less than eight milliseconds.

40. The transfer switch of claim 34, wherein the first power source and the second power source are two different phases of a three phase power source.

41. A transfer switch with arc suppression, comprising:
at least one microprocessor;
a first solid state switch and a first relay in parallel, wherein the at least one microprocessor is in communication with the first solid state switch and the first relay, and wherein the first solid state switch and the first relay are connected to an outlet;
a second solid state switch and a second relay in parallel, wherein the at least one microprocessor is in switch control communication with the second solid state switch and the second relay, and wherein the second solid state switch and the second relay are connected to the outlet;
a pair of power source inputs each including at least two phases from different three phase power sources, a first pair of phases from a three phase power source connected to a first power source input and a second pair of phases from a different three phase power source connected to a second power source input, the first power source input connected to the first solid state switch and the first relay and the second power source input connected to the second solid state switch and the second relay; and
a non-transitory memory having instructions stored thereon that when executed by the at least one microprocessor cause the at least one microprocessor, upon detection of an interruption in the first power source, to:
  activate the first solid state switch to shunt current around the first relay while opening the first relay;

deactivate the first solid state switch after the first relay is opened;

activate the second solid state switch while closing the second relay; and deactivate the second solid state switch after the second relay is closed so that voltage is available to the outlet via the second relay.

42. The transfer switch of claim 41, wherein the first and second solid state switches are triacs.

43. The transfer switch of claim 41, wherein the non-transitory memory has instructions stored thereon that when executed by the at least one microprocessor further cause the at least one microprocessor to confirm that the first relay is opened before deactivating the first solid state switch.

44. The transfer switch of claim 43, wherein the non-transitory memory has instructions stored thereon that when executed by the at least one microprocessor further cause the at least one microprocessor to confirm that the second relay is closed before deactivating the second solid state switch.

45. The transfer switch of claim 44, wherein the non-transitory memory has instructions stored thereon that when executed by the at least one microprocessor further cause the at least one microprocessor to impose a minimum delay before deactivating the first solid state switch.

46. The transfer switch of claim 45, wherein the minimum delay is less than eight milliseconds.

* * * * *

UNITED STATES PATENT AND TRADEMARK OFFICE
CERTIFICATE OF CORRECTION

PATENT NO. : 9,531,215 B2  
APPLICATION NO. : 13/425278  
DATED : December 27, 2016  
INVENTOR(S) : Carrel W. Ewing et al.

Page 1 of 1

It is certified that error appears in the above-identified patent and that said Letters Patent is hereby corrected as shown below:

On the Title Page

(75) Amend the inventorship to include ---Brian P. Auclair, Reno, NV---

Signed and Sealed this  
Fourteenth Day of August, 2018

Andrei Iancu  
*Director of the United States Patent and Trademark Office*